US010231469B2

(12) United States Patent
Kelly et al.

(10) Patent No.: US 10,231,469 B2
(45) Date of Patent: Mar. 19, 2019

(54) MYCELIATED PRODUCTS AND METHODS FOR MAKING MYCELIATED PRODUCTS FROM CACAO AND OTHER AGRICULTURAL SUBSTRATES

(71) Applicant: MYCOTECHNOLOGY, INC., Aurora, CO (US)

(72) Inventors: Brooks John Kelly, Boulder, CO (US); James Patrick Langan, Denver, CO (US)

(73) Assignee: MycoTechnology, Inc., Aurora, CO (US)

( * ) Notice: Subject to any disclaimer, the term of this patent is extended or adjusted under 35 U.S.C. 154(b) by 0 days.

(21) Appl. No.: 14/659,595

(22) Filed: Mar. 16, 2015

(65) Prior Publication Data
US 2015/0257406 A1  Sep. 17, 2015

Related U.S. Application Data

(63) Continuation of application No. PCT/US2014/029998, filed on Mar. 15, 2014.

(60) Provisional application No. 61/953,823, filed on Mar. 15, 2014.

(51) Int. Cl.
A23G 1/02 (2006.01)

(52) U.S. Cl.
CPC ..................... A23G 1/02 (2013.01)

(58) Field of Classification Search
CPC ....................................... A23G 1/02
USPC ........................................... 426/45
See application file for complete search history.

(56) References Cited

U.S. PATENT DOCUMENTS

| | | |
|---|---|---|
| 1,822,227 A | 9/1931 | Lendrich et al. |
| 2,451,567 A | 10/1948 | Elmer et al. |
| 2,693,664 A | 8/1949 | Szuecs |
| 2,505,811 A | 5/1950 | Szuecs |
| 2,693,665 A | 11/1954 | Harry |
| 2,761,246 A | 9/1956 | Szuecs |
| 2,928,210 A | 3/1960 | Cirillo et al. |
| 3,086,320 A | 4/1963 | Burdet |
| 3,701,714 A | 10/1972 | Okada et al. |
| 3,749,584 A | 7/1973 | Kurtzman et al. |
| 3,810,997 A | 5/1974 | Chien |
| 4,071,973 A | 2/1978 | Iizuka et al. |
| 4,590,160 A | 5/1986 | Nishihashi et al. |
| 4,891,220 A | 1/1990 | Byron |
| 5,934,012 A | 8/1999 | Holtz et al. |
| 6,045,834 A | 4/2000 | Howes et al. |
| 6,277,396 B1 | 8/2001 | Dente |
| 6,490,824 B1 | 1/2002 | Intabon et al. |
| 6,476,003 B1 | 11/2002 | Jordan et al. |
| 6,558,943 B1 | 5/2003 | Li et al. |
| 6,569,475 B2 | 5/2003 | Song |
| 8,486,675 B2 | 7/2013 | Tang |
| 8,529,981 B2 | 9/2013 | Tang |
| 8,535,907 B2 | 9/2013 | Tang |
| 8,623,445 B2 | 1/2014 | Tang |
| 8,685,475 B2 | 4/2014 | Kwack et al. |
| 8,821,955 B2 | 9/2014 | Tang |
| 9,034,402 B2 | 5/2015 | Wong |
| 9,068,171 B2 | 6/2015 | Kelly et al. |
| 9,427,008 B2 | 8/2016 | Kelly et al. |
| 9,480,274 B2 | 11/2016 | Tang |
| 9,572,363 B2 | 2/2017 | Langan et al. |
| 9,572,364 B2 | 2/2017 | Langan et al. |
| 2002/0082418 A1 | 6/2002 | Ikewaki et al. |
| 2002/0137155 A1 | 9/2002 | Wasser et al. |
| 2003/0208796 A1 | 11/2003 | Song et al. |
| 2004/0009143 A1 | 1/2004 | Golz-Berner et al. |
| 2004/0035047 A1 | 2/2004 | Hwang et al. |

(Continued)

FOREIGN PATENT DOCUMENTS

| | | |
|---|---|---|
| CN | 102860541 A | 1/2013 |
| DE | 4341316 | 6/1995 |

(Continued)

OTHER PUBLICATIONS

Chang, R. J. Alternative and Complementary Medincine. 2002. 8: 559-565.*
Fan, L. et al. Acta Biotechnol. 2000. 20: 41-52.*
WWW.shroomery.org/9145-10/12/2006.*
Office Action dated Feb. 19, 2014 for U.S. Appl. No. 13/844,685.
Autoclave Search (2014) www.meriam-webster.com/medlineplus/autoclave.
Berovic et al. (2003) "Submerged cultivation of Ganoderma lucidum biomass and immunostimulatory effects of fungal polysaccharides" J. Biotechnol. 103(1): 77-86.
Bok et al. Phytochemistry (1999) "Antitumor sterols from the mycelia of Cordyceps sinensis" 51: 891-898.

(Continued)

Primary Examiner — Hamid R Badr
(74) Attorney, Agent, or Firm — Leydig, Voit & Mayer, Ltd.

(57) ABSTRACT

The present invention provides a method for the preparation of a myceliated cacao bean or other agricultural product. This method includes providing cacao beans or other agricultural substrate, optionally hydrating the cacao beans or other agricultural product, and optionally pasteurizing or sterilizing the cacao beans or other agricultural substrate to provide prepared cacao beans or other agricultural substrate, and a step of inoculating the prepared cacao beans or other agricultural substrate with a prepared fungal component and culturing the inoculated cacao beans or other agricultural substrate to prepare the myceliated product. The methods of the instant invention result in prepared cacao beans or other agricultural substrate having reduced levels of undesirable taste components, such as theobromine, catechin, epicatechin, gallic acid equivalents, and/or 2-methoxy-3-isopropylpyrazine, and increased levels of myceliation products, such as fungal β-glucans, chitin, proteins, glycoproteins, pyrazines and polysaccharides, relative to starting cacao beans or other agricultural substrate.

20 Claims, No Drawings

(56) References Cited

U.S. PATENT DOCUMENTS

| | | |
|---|---|---|
| 2004/0211721 A1 | 10/2004 | Stamets |
| 2005/0180989 A1 | 8/2005 | Matsunaga |
| 2005/0255126 A1 | 11/2005 | Tsubaki et al. |
| 2005/0273875 A1 | 12/2005 | Elias |
| 2006/0014267 A1 | 1/2006 | Cleaver et al. |
| 2006/0134294 A1 | 6/2006 | McKee et al. |
| 2006/0280753 A1 | 12/2006 | McNeary |
| 2007/0160726 A1 | 7/2007 | Fujii |
| 2008/0031892 A1 | 2/2008 | Kristiansen |
| 2008/0057162 A1 | 3/2008 | Brucker et al. |
| 2008/0107783 A1 | 5/2008 | Anijis et al. |
| 2008/0171104 A1 | 7/2008 | Zhu |
| 2008/0193595 A1 | 8/2008 | De Vuyst et al. |
| 2008/0264858 A1 | 9/2008 | Stamets |
| 2008/0274234 A1 | 11/2008 | Miller |
| 2008/0296223 A1 | 12/2008 | Hiromoto |
| 2008/0299645 A1 | 12/2008 | Holliday |
| 2009/0047236 A1 | 2/2009 | Stamets |
| 2009/0047237 A1 | 2/2009 | Stamets |
| 2009/0053363 A1 | 2/2009 | An |
| 2009/0098244 A1 | 4/2009 | Schatzmayr et al. |
| 2009/0104310 A1 | 4/2009 | Nakajima |
| 2009/0130138 A1 | 5/2009 | Stamets |
| 2009/0220645 A1 | 9/2009 | Martinez |
| 2009/0280212 A1 | 11/2009 | Sugimoto et al. |
| 2010/0055241 A1 | 3/2010 | Nakano et al. |
| 2010/0183765 A1 | 7/2010 | Laan Van Der et al. |
| 2010/0203189 A1 | 8/2010 | Holliday |
| 2010/0203194 A1 | 8/2010 | Salminen et al. |
| 2010/0221385 A1 | 9/2010 | Matsui et al. |
| 2010/0239711 A1* | 9/2010 | Li .................. A23F 5/02 426/45 |
| 2010/0266726 A1 | 10/2010 | Ogura et al. |
| 2010/0316763 A1 | 12/2010 | Choi et al. |
| 2011/0008384 A1 | 2/2011 | Stamets |
| 2011/0052758 A1 | 3/2011 | Greiner-Stoeffele et al. |
| 2011/0070332 A1 | 3/2011 | Bernaert et al. |
| 2011/0081448 A1 | 4/2011 | Dunphy et al. |
| 2011/0091579 A1 | 4/2011 | Hausman |
| 2011/0123675 A1 | 5/2011 | Bernaert et al. |
| 2011/0189220 A1 | 8/2011 | Yang |
| 2011/0200551 A1 | 8/2011 | Stamets |
| 2011/0206721 A1 | 8/2011 | Nair |
| 2011/0229616 A1 | 9/2011 | Anijis et al. |
| 2011/0250339 A1 | 10/2011 | Onishi et al. |
| 2011/0262593 A1 | 10/2011 | Binggeli et al. |
| 2011/0268980 A1 | 11/2011 | Kalisz et al. |
| 2012/0017781 A1 | 1/2012 | Ceccarelli |
| 2012/0027889 A1 | 2/2012 | Portella |
| 2012/0028345 A1* | 2/2012 | Ibrahim .............. C12M 21/16 435/289.1 |
| 2012/0034339 A1 | 2/2012 | Giuliani et al. |
| 2012/0034344 A1 | 2/2012 | Menon et al. |
| 2012/0082754 A1 | 4/2012 | Holliday |
| 2012/0100249 A1 | 4/2012 | Van Der Laan et al. |
| 2012/0128823 A1 | 5/2012 | Camu |
| 2012/0171308 A1 | 7/2012 | Da Luz Moreira et al. |
| 2012/0177781 A1 | 7/2012 | Hayashi |
| 2012/0190093 A1 | 7/2012 | Fukuda |
| 2012/0231114 A1 | 9/2012 | Bezerra De Oliveira et al. |
| 2012/0244254 A1 | 9/2012 | Takahashi |
| 2012/0321744 A1 | 12/2012 | Chhun et al. |
| 2013/0209608 A1 | 8/2013 | Berends et al. |
| 2013/0209609 A1 | 8/2013 | Moreno et al. |
| 2013/0337114 A1 | 12/2013 | Binggeli et al. |
| 2014/0065131 A1 | 3/2014 | Kelly et al. |
| 2014/0105928 A1 | 4/2014 | Stamets |
| 2014/0170264 A1 | 6/2014 | Kelly et al. |
| 2014/0302560 A1 | 10/2014 | Kelly |
| 2015/0257405 A1 | 9/2015 | Kelly et al. |
| 2015/0272155 A1 | 10/2015 | Kelly et al. |
| 2016/0058049 A1 | 3/2016 | Langan et al. |
| 2016/0120201 A9 | 5/2016 | Kelly et al. |
| 2016/0249660 A1 | 9/2016 | Langan et al. |
| 2017/0156383 A1 | 6/2017 | Langan et al. |

FOREIGN PATENT DOCUMENTS

| | | |
|---|---|---|
| EP | 1173544 | 1/2002 |
| EP | 0 946 106 B1 | 5/2002 |
| EP | 1 428 440 A1 | 6/2004 |
| EP | 1695631 A1 | 8/2006 |
| EP | 2474221 | 2/2011 |
| EP | 1 534 088 B1 | 9/2011 |
| EP | 2 591 683 A2 | 5/2013 |
| EP | 2 166 879 B1 | 10/2014 |
| GB | 2059243 | 4/1981 |
| JP | 50-37742 | 12/1975 |
| JP | 59-135840 | 4/1984 |
| JP | 61-219340 | 8/1986 |
| JP | 6291161 A | 4/1987 |
| JP | 4-126037 | 4/1992 |
| JP | 11346657 | 12/1999 |
| JP | 2005/0027540 | 2/2005 |
| JP | 2011-103901 A | 6/2011 |
| KR | 1487724 B1 | 2/2015 |
| NL | 7322 C | 4/1921 |
| WO | WO 2001/032830 | 5/2001 |
| WO | WO 2006/107208 | 10/2006 |
| WO | WO 2007/031186 | 3/2007 |
| WO | 2010/038867 A1 | 4/2010 |
| WO | WO 2011/012680 | 2/2011 |
| WO | WO 2011/032244 | 3/2011 |
| WO | WO 2011/151831 | 12/2011 |
| WO | WO 2013/171194 | 11/2013 |
| WO | 2014/055035 A1 | 4/2014 |
| WO | WO 2014/145256 A1 | 9/2014 |
| WO | WO 2014/145265 A2 | 9/2014 |
| WO | PCT/US16/19929 | 2/2016 |
| WO | WO 2016/033241 | 3/2016 |
| WO | WO 2016/138476 | 9/2016 |

OTHER PUBLICATIONS

"Can You Eat Mycelium?" (2014) wiki.answers.com.
de Melo, Rodrigues et al. (2008) Influence of Flammulina velutipes mycelia culture conditions on antimicrobial metabolite production Mycoscience 50(1): 78-81.
"Eat Mycelium cakes?" (2014) Mycotopia.net.
"Eat Mycelium?" (2014) fungifun.com.
"Eating mycelium to trip" (2014) shroomery.org.
"Eating Mycelium?" (2014) zoklet.net.
"Eating Mycelium" (2014) wisegeek.com Conjecture Corporation.
Encyclopedia Britannica, Louis Pasteur, Datasheet [online]. Copyright 2014 Encyclopedia Britannica Inc. [retrieved on Feb. 6, 2014]. Retrieved from the Internet: <URL: http://www.britannica.com/Ebchecked/topic/445964/Louis-Pasteur>. Specif, p. 3.
English translation.deOliverir, B. et al. WO 2011/032244 A1. Flours produced from fungus myceliated grain. Published Mar. 24, 2011. pp. 1-24. specif, pp. 2, 6-7.
Firenzuoli et al. (2008) "The Medicinal Mushroom Agaricus blazei Murrill: Review of Literature and Pharmaco-Toxicological Problems" Evid. Based Complement Alternat. Med. 5(1): 3-15.
Foster (2014) "What is Mycelium?" wisegeek.com. Conjecture Corporation.
Han (2005) Solid-state fermentation of cornmeal with the basidiomycete Ganoderma lucidum for degrading starch and upgrading nutritional value J. Appl. Micro. 2005, 99: 910-915.
Hashim, Puziah (1997) "Effect of Processing on Flavour Precursors, Pyrazines and Flavour Quality of Malaysian Cocoa Beans". PhD thesis, Universiti Pertanian Malaysia.
Ikrawan, Yusep (2003) Influence of Carboxypeptidases on Cocoa Specific Aroma Precursors and Methylpyrazines in Under-Fermented Cocoa Beans. PhD thesis, Universiti Putra Malaysia.
Ishikawa et al. (2001) "Antimicrobial Cuparene-Type Sesquiterpenes, Enokipodins C and D, from a Mycelial Culture of Flammulina velutipes" J. Nat. Prod. 64(7): 932-934.
Kang (2005) Abstract of "Studies on chemical constituents in the mycelia from fermented culture of Flammulina velutipes" Zhongguo Zhong Yao Za Zhi 30(30): 193-195.

(56) References Cited

OTHER PUBLICATIONS

Kang (2003) Abstract of "Studies on chemical constituents of the mycelia from fermented culture of Flammulina velutipes" Zhongguo Zhong Yao Za Zhi 28(11): 1038-1040.

Konno et al. (2002) "Anticancer and Hypoglycemic Effects of Polysaccharides in edible and Medicinal Maitake Mushroom [Grifola frondosa(Dicks.:Fr.) S. F. Gray]" International Journal of Medicinal Mushrooms 4(3): 10-21.

Kuo et al. (1996) "Cordyceps sinensis as an Immunomodulatory Agent" Am. J. Chin. Med. (1996) 24: 111-125.

Lakshmi et al. (2003) Abstract of "Antiperoxidative, anti-inflammatory, and antimutagenic activities of ethanol extract of the mycelium of Ganoderma lucidum occurring in South India"Teratog. Carcinog. Mutagen 1: 85-97.

Lee et al. (2003) "Biological activities of the polysaccharides produced from submerged culture of the edible Basidiomycete Grifola frondosa" Enzyme and Microbial Technology 32(5): 574-581.

Liu et al. (2012) Molecules, 17:12575-12586, Improving the Fermentation Production of the Individual Key Triterpene Ganoderic Acid Me by the Medicinal Fungus Ganoderma lucidum in Submerged Culture.

McMahon (2014) "How Can I Make Tempeh?" wisegeek.com Conjecture Corporation.

MicrobiologyBytes. Introduction to Mycology. Datasheet [online'. Updated Apr. 8, 2009 [retrieved on Feb. 6, 2014]. Retrieved from the Internet: <URL: http://www.microbiologybytes.com/introduction/mycl.html>. Specif, p. 8.

Mohamed Ali, Aisha Bibi (2010) Production of pyrazine flavours by mycelial fungi. Master's thesis, University of Pretoria.

Morris et al. (2003) Abstract of "Immunomodulating Effects of Hot-Water Extract From Pleurotus Ostreatus Mycelium on Cyclophosphamide Treated Mice" Micologia Aplicada Internacional 15(1): 7-13.

Paterson (2006) "Ganoderma—A therapeutic fungal biofactory" Phytochemistry 67:1985-2001.

Shao et al. (2001) "Determination of nucleosides in natural Cordyceps sinensis and cultured Cordyceps mycelia by capillary electrophoresis" Electrophoresis 22(1): 144-150.

Stamets (2003) Chapter 12, pp. 89-92 "Culturing Mushroom Mycelium on Agar Media."

Taylor, J. (2001) "Measuring Fungal Growth." Chapter 3.8 In: Microorganisms and Biotechnology, 2nd ed., Thomas Nelson, Ltd. 2001 Delta Place, Cheltenham, U. K. (ISBN 0 17 448255 8). Specif. p. 4 (book p. 44).

Ulziijargal et al. (2011) : Nutrient Compositions of Culinary-Medicinal Mushroom Fruiting Bodies and Mycelia Int. J. Med. Mushrooms 13(4): 343-349.

Wasser (2002) "Medicinal mushrooms as a source of antitumor and immunomodulating polysaccharides" Appl Microbiol Biotechnol 60: 258-274.

Willis, W.L. et al. (2010) Effect of Dietary Fungus Myceliated Grain on Broiler Performance and Enteric Colonization with Bifidobacteria and Salmonella International Journal of Poultry Science., 9(1): 48-52.

Wu et al. (2011) "Ling Zhi-8 mediates p53-dependent growth arrest of lung cancer cells proliferation via the ribosomal protein S7-MDM2-p53 pathway" Carcinogenesis 32(12): 1890-1896.

Yin et al. (2010) "Purification, Characterization and Immuno-Modulating Properties of Polysaccharides Isolated from Flammulina velutipes Mycelium" Am. J. Chin. Med. 38(1): 191-204.

Zhang et al. (2004) Life Sciences, 75:2911-2919, "Induction of HL-60 apoptosis by ethyl acetate of Cordyceps sinensis fungal mycelium."

Zhang et al. (2010) "Mycelial growth and polysaccharide content of Polyporus umbellatus" Journal of Medicinal Plants Research 4(18): 1847-1852.

Zhou et al. (2009) "Cordyceps fungi: natural products, pharmacological functions and developmental products" Journal of Pharmacy and Pharmacology 61:279-291.

Internation Search Report and the Written Opinion of the International Searching Authority, or the Declaration for PCT/US14/29989 dated Aug. 12, 2014.

Internation Search Report and the Written Opinion of the International Searching Authority, or the Declaration for PCT/US14/29998 dated Sep. 11, 2014.

Russell, R. et al. 2006. Ganoderma—a therapeutic fungal biofactory. Phytochemistry 67:1985-2001. specif, pp. 1985, 1987-1988, 1994-1995, 1997-1998.

Chang et al. (2009) "Gandoderma lucidum Extract Promotes Immune Responses in Normal BALB/c Mice In Vivo", in vivo, V. 23: 755-760.

Sone et al. (1985) "Structures and Antitumor Activities of the Polysaccharides Isolated from Fruiting Body and the Growing Culture of Mycelium of Ganoderma lucidum", Agric. Biol. Chem., V. 49(9): 2641-2653.

Zhong et al. (2004) "Submerged Cultivation of Medicinal Mushrooms for Production of Valuable Bioactive Metabolites", Adv Biochem Engin/Biotechnol V. 87: 25-59.

Emden (2015) "Decaffeination 101: Four Ways to Decaffeinate Coffee" Coffee Connection; retrieved from: http://www.coffeeconfidential.org/health/decaffeination/ Jan. 29, 2015. 7 pages.

Tsubouchi et al. (1987) "Effect of roasting on ochratoxin a level in green coffee beans inoculated with Aspergillus ochraceus", Mycopathologia 97: 111-115.

Kamimura, Hisashi (1989) "Removal of Mycotoxins during Food Processing" Tokyo Metropolitan Research Laboratory of Public Health article: 88-94.

He, Jianwei et al. (2010) "Patented Techniques for Detoxification of Mycotoxins in Feeds and Food Matrices" Recent Patents on Food, Nutrition & Agriculture, vol. 2:96-104.

U.S. Appl. No. 13/844,685, filed Mar. 15, 2013, Brooks John Kelly.
U.S. Appl. No. 13/859,719, filed Apr. 9, 2013, Brooks John Kelly.
U.S. Appl. No. 13/874,832, filed May 1, 2013, Brooks John Kelly.
U.S. Appl. No. 14/020,512, filed Sep. 6, 2013, Brooks John Kelly.
U.S. Appl. No. 14/020,781, filed Sep. 6, 2013, Brooks John Kelly.
U.S. Appl. No. 14/659,057, filed Mar. 16, 2015, Brooks John Kelly.
U.S. Appl. No. 14/659,595, filed Mar. 16, 2015, Brooks John Kelly.
U.S. Appl. No. 14/734,943, filed Jun. 9, 2015, Brooks John Kelly.
U.S. Appl. No. 14/836,830, filed Aug. 26, 2015, James Patrick Langan.
U.S. Appl. No. 15/144,164, filed May 2, 2016, James Patrick Langan.
U.S. Appl. No. 15/438,576, filed Feb. 21, 2017, James Patrick Langan.
U.S. Appl. No. 15/488,183, filed Apr. 14, 2017, Bhupendra Kumar Soni.

Schindler et al. (2012) "Improvement of the Aroma of Pea (Pisum sativum) Protein Extracts by Lactic Acid Fermentation," Food Biotechnol. 26(1):58-74.

Buffo et al. (2004) "Coffee flavour: an overview," Flavour and Fragrance Journal. 19:99-104.

Hadar et al. (1986) "Chemical Composition of the Edible Mushroom Pleurotus ostreatus Produced by Fermentation," Appl. Environ. Microbiol. 51:1352-1354.

Nagai et al. (2006) "Characterization of honey from different floral sources. Its functional properties and effects of honey species on storage of meat," Food Chemistry. 97:256-262.

Namebright "Technique Sheet: Culture Media for Fungi," Available on the Internet at URL: www.centralpamushroomclub.org/sites/default/files/culture.pdf. [Last Accessed Feb. 12, 2015].

Nowrousian et al. (2007) "The novel ER membrane protein PRO41 is essential for sexual development in the filamentous fungus Sordaria macrospora," Molecular Microbiology. 64(4):923-937.

Song et al. (2002) "Antioxidant properties of Antrodia camphorata in submerged culture," Journal of Agricultural Food Chemistry 50:3322-3327.

Tang et al. (2002) "Fed-batch fermentation of Ganoderma lucidum for hyperproduction of polysaccharide and ganoderic acid," Enzyme Microbial Technol. 31:20-28.

U.S. Appl. No. 15/144,164, filed May 2, 2016, Langan et al.

(56) References Cited

OTHER PUBLICATIONS

Beuchat, "13 Indigenous Fermented Foods" Biotechnology Second Edition (eds H.-J. Rehm and G. Reed), Wiley-VCH Verlag GmbH, Weinheim, Germany, p. 505-559, 2001.

Chang et al. (2002), "Bioactive Polysaccharides from Traditional Chinese Medicine Herbs as Anticancer Adjuvants", The Journal of Alternative and Complementary Medicine, V. 8 (5): 559-565.

Crafack et al., "Influencing cocoa flavour using Pichia Kluyveri and Kluyveromyces marxianus in a defined mixed starter culture for cocoa fermentation", International Journal of Food Microbiology 167: 103-116 (2013).

Diekman, "Sweeterners Facts and Fallacies: Learn the Truth about the Different Types of Sweeterners to Better Counsel Patients", Today's Dietitian 14(9): pp. 42-45, Sep. 2012.

EP Search Report for EP 14763975.1, dated Sep. 14, 2016, 13 pages.

European Search Report for Application No. 14765389.3, dated Nov. 17, 2016, 9 pages.

International Preliminary Report on Patentability for PCT/US2014/029989 dated Sep. 15, 2015, 9 pages.

International Preliminary Report on Patentability for PCT/US2014/029998 dated Sep. 15, 2015, 8 pages.

International Search Report and Written Opinion for PCT/US15/47036 dated Jan. 29, 2016, 16 pages.

ISR & WO for PCT/US2016/019929, dated May 19, 2016, 14 pages.

Japanese Office Action—English Translation for Application No. 2016-503300, dated Sep. 21, 2016, 6 pages.

Japanese Office Action (Untranslated) for 2016-503300, 5 pages.

Japanese Office Action—Englisth Translation for Application No. 2016-503304, dated Sep. 30, 2016, 9 pages.

Japanese Office Action (Untranslated) for 2016-503304, 8 pages.

Lefeber et al., "On-farm implementation of a starter culture for improved cocoa bean fermentation and its influence on the flavour of chocolates produced thereof", Food Microbiology 30:379-392 (2012).

Ogundero, "Thermophilic fungi and fermenting cacao beans in Nigeria", Mycopathologia 82, 159-165 (1983).

Pandey et al. (2000) "Use of Various Coffee Industry Residues for the Cultivation of Pleurotus streatus in Solid State Fermentation", Acta Biotechnol. V 20(1):41-52.

Partial English translation of JP61-219340, JP50-37742 and JP4-126037.

Schwan, "Cocoa Fermentations Conducted with a Defined Microbial Cocktail Inoculum", Applied and Environmental Microbiology, vol. 64, No. 4, Apr. 1998, p. 1477-1483.

Schwan, "The Microbiology of Cocoa Fermentation and its Role in Chocolate Quality", Critical Reviews in Food Science and Nutrition, 44:205-221 (2004).

Jonathan et al. (2011) "Evaluation of Ten Wild Nigerian Mushrooms for Amylase and Cellulase Activities," Mycobiol. 39(2):103-108.

Thammawat et al. (2008) "Isolation, Preliminary Enzyme Characterization and Optimization of Culture Parameters for Production of Naringinase Isolated from Aspergillus niger BCC 25166," Kasetsart J. (Nat. Sci.) 42:61-72.

International Search Report with Written Opinion corresponding to International Patent Application No. PCT/US2017/027731, dated Jul. 19, 2017.

\* cited by examiner

MYCELIATED PRODUCTS AND METHODS FOR MAKING MYCELIATED PRODUCTS FROM CACAO AND OTHER AGRICULTURAL SUBSTRATES

CROSS-REFERENCE TO RELATED APPLICATIONS

This application claims priority to U.S. Provisional Application Ser. No. 61/953,823 entitled "Myceliated Products and Methods for Making Myceliated Products from Cacao and Other Agricultural Substrates", filed Mar. 15, 2014; this application also claims priority as a continuation to pending WIPO application PCT/US14/29998, filed Mar. 15, 2014, entitled "Myceliated Products And Methods For Making Myceliated Products From Cacao And Other Agricultural Substrates," and the disclosure of each is hereby incorporated by reference herein in their entirety.

TECHNICAL FIELD

The methods and products relate to use of fungal strains and mycotechnological methods to improve flavor in agricultural substrates, in particular, cacao and other agricultural substrates.

BACKGROUND

Most of the world's cacao is grown in a band spanning 20 degrees of latitude north and south of the equator, as the cacao tree (*Theobroma cacao*) needs a humid, hot tropical environment in which to grow and fruit healthy cacao pods that contain the cacao bean. Harvested when ripe, the average cacao pod produces 20 to 50 cacao beans emulsed in mucilaginous pulp. Generally, cacao beans are prepared for the market by fermenting the beans for four to seven days (to remove the pulp, a step also known as demucilaging which may be accomplished by other methods known in the art) and the beans are dried for another five to fourteen days. There are about 20 different species of cacao and hundreds of hybrids. Of these, four major varietals dominate the commercial chocolate market. *Forastero cacao* accounts for approximately 90% of the world's cacao market. *Criollo cacao* accounts for about 7% of the global market, and is characterized as a finer, gourmet cacao that is more difficult to grow than *Forastero*. *Trinitario cacao* is a Forastero/Criollo hybrid that grows well in Trinidad. *Nacional cacao* is prized for having low bitterness and a sweet floral aroma, but is difficult to grow commercially. A majority of the world's cacao is produced in the Ivory Coast. This volume represents over 1 million tons per year. Ghana, Indonesia, Cameroon, Brazil, and Nigeria produce major amounts of cacao as well. Cacao is consumed world-wide, usually in the form of chocolate, which is a mixture solidified cacao liquor and sweeteners, among other components.

It is common for cacao beans to be treated with super-heated steam to mitigate the bacterial content. It is believed that treating cacao beans with saturated steam also removes some of the desirable flavor components. Sugars and other sweeteners are mixed with cacao powder to form good-tasting chocolate. Often other flavors are added. Currently many health advocates, while acknowledging the health benefits of cacao, warn against the risks of excessive use of sweeteners including sugar and artificial sweeteners.

What is desired is a way of manufacturing cacao that achieves a great tasting product without the need for excessive sweetening. What is also desired is a way of processing cacao that retains desirable flavor components while minimizing the less desirable flavor components. Further, it is desirable to rely on natural processes to achieve a great tasting product. Cacao is a complex food reported to contain over 20,000 different chemical compounds, making this a complex and hard-to-predict task.

A need remains in the art for improved cacao products having reduced levels of undesirable taste components and/or increased levels of flavor and/or health promoting components relative to cacao beans or other agricultural substrate, and for methods of obtaining such products.

SUMMARY OF THE INVENTION

In one embodiment, the present invention provides a method for the preparation of a myceliated cacao or other agricultural substrate product. This method includes the step of providing prepared cacao beans or other agricultural substrate, which includes providing cacao beans or other agricultural substrate, optionally hydrating the provided cacao beans or other agricultural substrate, and sterilizing and/or pasteurizing the cacao beans or other agricultural substrate to provide prepared cacao beans or other agricultural substrate. The method also includes the step of providing a prepared fungal component. The method also comprises inoculating the prepared cacao beans or other agricultural substrate with the prepared fungal component and culturing the inoculated cacao beans or other agricultural substrate to prepare the myceliated cacao or other agricultural substrate product.

In one embodiment, the method includes reducing the amount of undesirable taste components. Reducing the amount of undesirable taste components optionally includes at least one, or two aqueous extractions of the cacao beans or other agricultural substrate. An undesirable taste component includes catechins, theobromine and/or 2-methoxy-3-isopropylpyrazine.

In one embodiment, the method includes a step of hydrating the cacao beans or other agricultural substrate, to a moisture content of 20 to 80%, optionally to about 40%. The methods of the instant invention also include where the prepared fungal component comprises an edible mycelium, such as, for example: *Hericium erinaceus, Pleurotus ostreatus, Pleurotus eryngii, Pleurotus citrinopileatus, Pleurotus djamor, Trametes versicolor, Lentinula edodes, Armillariella mellea, Tricholoma matsutake, Flammulina velutipes, Volvariella volvacea, Agaricus campestris, Agaricus blazei, Grifola frondosa, Pholiota nameko, Boletus edulis, Ganoderma lucidum, Ganoderma applanatum, Hypsizygus marmoreus, Morchella hortensis, Morchella angusticeps, Morchella esculenta, Phellinus linteus, Auricularia auricula, Tremella fuciformis, Inonotus obliquus, Fomes fomentarius, Laetiporus sulfureus, Cordyceps sinensis, Cordyceps militaris, Cantharellus cibarius, Polyporus umbellatus,* and combinations thereof. The methods of the invention include screening a number of strains of fungi and selecting a strain having an enhanced ability to grow on, metabolize, or utilize cacao beans or other agricultural substrate, and/or selecting a strain that is capable of enhanced removal of one or more undesirable taste components from the cacao beans or other agricultural substrate, and/or enhanced removal of caffeine from the cacao beans or other agricultural substrate.

In another embodiment, the prepared fungal component is maintained on an undefined media comprising an aqueous cacao bean, optionally organic, or other agricultural substrate extract and optionally an energy source, or, optionally, the media further comprises an added component such as 2-methoxy-3-isopropylpyrazine, catechin, epicatechin, gallic acid equivalents, and/or theobromine The maintenance of the strain of fungi causes an adaptation of the fungi resulting in enhancement of the fungi's ability to grow on, metabolize or utilize cacao beans or other agricultural substrate, and/or the added component.

The inventive methods also include where the culturing step is a fermentation and/or myceliation step carried out under semi-anaerobic or aerobic conditions, where sterile air-flow, relative humidity, lighting and temperature are optionally controlled for, optionally for about 5 days.

The methods of the instant invention result in myceliated cacao products having reduced levels of undesirable taste components, such as 2-methoxy-3-isopropylpyrazine, catechins, theobromine, and increased levels of myceliation products, such as fungal (1->3)(1-->6) β-glucans, and other fungal metabolites, relative to the non-myceliated cacao products or other agricultural substrate.

The present invention includes a myceliated cacao product and cacao beans or other agricultural substrate prepared by the methods of the invention, and a myceliated cacao or other agricultural product having reduced levels of undesirable taste components and increased levels of myceliation products, such as fungal metabolites, relative to starting or untreated cacao beans or other agricultural substrate.

DETAILED DESCRIPTION OF THE INVENTION

In one embodiment, the present invention provides a method for the preparation of a myceliated cacao (or other agricultural substrate) product. This method includes the step of providing prepared cacao beans or other agricultural substrate, which includes providing the green cacao beans or other agricultural substrate, optionally hydrating the provided green cacao beans, and sterilizing and/or pasteurizing the cacao beans or other agricultural substrate to provide prepared cacao or other agricultural substrate. The methods of the invention also include the step of providing a prepared fungal component. The method also comprises inoculating the prepared cacao beans or other agricultural substrate in sterile operation with the prepared fungal component and culturing the prepared inoculated cacao beans or other agricultural substrate and prepared fungal component together to effect myceliation to produce the myceliated cacao or other agricultural substrate product. These steps may be performed in any order.

In one embodiment, prepared cacao or other agricultural substrate are provided, which includes the step of providing cacao or other agricultural substrate.

One agricultural substrate includes cacao beans or other agricultural substrate. One agricultural substrate is cacao beans. *Theobroma cacao,* hereinafter "cacao" or "cacao", belongs to the genus *Theobroma* classified under the subfamily Sterculioidea of the mallow family Malvaceae. There are about 20 different varieties of cacao varieties and hundreds of hybrids and all are suitable for use in the present invention, for example, suitable cacao beans are *Forastero cacao, Criollo cacao, Trinitario cacao,* and *Nacional cacao.* The present invention can be used with any bean from any plant of the genus *Theobroma,* including any genetically-modified (GMO) strains or cultivars and also any heirloom variety (non-GMO) strains or cultivars.

Cacao (or cacao) beans suitable for the present invention have been harvested when the cacao pod is ripe. The average cacao pod produces 20 to 50 cacao beans emulsed in mucilaginous pulp. Generally, the cacao pod is prepared for the market by fermenting the pod for four to seven days (to remove the pulp) and the beans are dried for another five to fourteen days. The dried beans are suitable for the present invention.

The raw cacao beans have an abundance of naturally occurring bacteria and other microbes. It is common for cacao beans to be treated with superheated steam to mitigate the bacterial content. It is believed that treating cacao beans with saturated steam also removes some of the desirable flavor components. Superheated steam-treated cacao beans are also suitable for the present invention.

Agricultural substrates that may be myceliated in accordance with this invention include: all cereals, grains, all species of wheat, rye, brown rice, white rice, red rice, gold rice, wild rice, rice, barley, triticale, rice, sorghum, oats, millets, quinoa, buckwheat, fonio, amaranth, teff and durum; apples and pears, apricots, cherries, almonds, peaches, strawberries, raisins, manioc, cacao, banana, *Rubiaceae* sp. (coffee), lemons, oranges and grapefruit; tomatoes, potatoes, peppers, eggplant, Allspice, mango powder, Angelica, Anise (*Pimpinella anisum*), Aniseed myrtle (*Syzygium anisatum*), Annatto (*Bixa orellana*), Apple mint (*Mentha suaveolens*), *Artemisia vulgaris, Mugwort, Asafoetida (Ferula assafoetida*), Berberis, Banana, Basil (*Ocimum basilicum*), Bay leaves, Bistort (*Persicaria bistorta*), Black cardamom, Black cumin, Blackcurrant, Black limes, Bladder wrack (*Fucus vesiculosus*), Blue Cohosh, Blue-leaved Mallee (*Eucalyptus polybractea*), Bog Labrador Tea (*Rhododendron groenlandicum*), Boldo (*Peumus boldus*), Bolivian Coriander (*Porophyllum ruderale*), Borage (*Borago officinalis*), Calamus, Calendula, Calumba (*Jateorhiza calumba*), Chamomile, Cannabis, Caper (*Capparis spinosa*), Caraway, Cardamom, Carob Pod, Cassia, Casuarina, Catnip, Cat's Claw, Catsear, Cayenne pepper, *Celastrus paniculatus,* Comfrey, Celery salt, Celery seed, Centaury, Chervil (*Anthriscus cerefolium*), Chickweed, Chicory, Chile pepper, Chili powder, Cinchona, Chives (*Allium schoenoprasum*), Cicely (*Myrrhis odorata*), Cilantro (see Coriander) (*Coriandrum sativum*), Cinnamon (and Cassia), Cinnamon Myrtle (*Backhousia myrtifolia*), Clary, Cleavers, Clover, Cloves, Coffee, Coltsfoot, Comfrey, Common Rue, Condurango, Coptis, Coriander, Costmary (*Tanacetum balsamita*), Couchgrass, Cow Parsley (*Anthriscus sylvestris*), Cowslip, Cramp Bark (*Viburnum opulus*), Cress, Cuban Oregano (*Plectranthus amboinicus*), Cudweed, Cumin, Curry leaf (*Murraya koenigii*), Damiana (*Turnera aphrodisiaca*), Dandelion (*Taraxacum officinale*), Demulcent, Devil's claw (*Harpagophytum procumbens*), Dill seed, Dill (*Anethum graveolens*), Dorrigo Pepper (*Tasmannia stipitata*), Echinacea, Echinopanax Elatum, Edelweiss, Elderberry, Elderflower, Elecampane, *Eleutherococcus senticosus,* Epazote (*Chenopodium ambrosioides*), Ephedra, Eryngium foetidum, Eucalyptus, Fennel (*Foeniculum vulgare*), Fenugreek, Feverfew, Figwort, Five-spice powder (Chinese), Fo-ti-tieng, Fumitory, Galangal, Garam masala, Garden cress, Garlic chives, Garlic, Ginger (*Zingiber officinale*), Ginkgo biloba, Ginseng, Ginseng, Siberian (*Eleutherococcus senticosus*), Goat's Rue (*Galega officinalis*), Goada masala, Golden Rod, Golden Seal, Gotu Kola, Grains of paradise (*Aframomum melegueta*), Grains of Selim (*Xylopia aethiopica*), Grape seed extract, Green tea, Ground Ivy, Guaco, Gypsywort, Hawthorn (*Crataegus sanguinea*), Hawthorne Tree, Hemp, Herbes de Provence, Hibiscus, Holly, Holy Thistle, Hops, Horehound, Horseradish, Horsetail (*Equisetum telmateia*), Hyssop (*Hyssopus officinalis*), Jalap, Jasmine, Jasmin pearl, Jiaogulan (*Gynostemma pentaphyllum*), Joe Pye weed (Gravelroot), John the Conqueror, Juniper, Kaffir Lime Leaves (*Citrus hystrix, C. papedia*), Kaala masala, Knotweed, Kokam, Labrador tea, Lady's Bedstraw, Lady's Mantle, Land cress, Lavender (*Lavandula* spp.), Ledum, Lemon Balm (*Melissa officinalis*), Lemon basil, Lemongrass (*Cymbopogon citratus, C. flexuosus,* and other species), Lemon Ironbark (*Eucalyptus staigeriana*), Lemon mint, Lemon Myrtle (*Backhousia citriodora*), Lemon Thyme, Lemon verbena (*Lippia citriodora*), Licorice—adaptogen, Lime Flower, Limnophila aromatica, Linseed, Liquorice, Long pepper, Lovage (*Levisticum officinale*), Luohanguo, Mace, Mahlab, Malabathrum, Manchurian Thorn Tree (*Aralia manchurica*), Mandrake, Marjoram (*Origanum majorana*), Marrubium vulgare, Marsh Labrador Tea, Marshmallow, Mastic, Meadowsweet, Mei Yen, Melegueta pepper (*Aframomum melegueta*), Mint, Milk thistle (*Silybum*), Bergamot (*Monarda didyma*), Motherwort, Mountain Skullcap, Mullein (*Verbascum thapsus*), Mustard, Mustard seed, Nashia inaguensis, Neem, Nepeta, Nettle, Nigella sativa, Kolanji, Black caraway, Noni, Nutmeg, Mace, Marijuana, Oenothera (*Oenothera biennis*), Olida (*Eucalyptus olida*), Oregano (*Origanum vulgare, O. heracleoticum*), Orris root, Osmorhiza, Olive Leaf (used in tea and as herbal supplement), Panax quinquefolius, Pandan leaf, Paprika, Parsley (*Petroselinum crispum*), Passion Flower, Patchouli, Pennyroyal, Pepper (black, white, and green), Peppermint, Peppermint Gum (*Eucalyptus dives*), Perilla, Plantain, Pomegranate, Ponch phoran, Poppy seed, Primrose (*Primula*), candied flowers, dry tea mixes, Psyllium, Purslane, Quassia, Quatre epices, Ramsons, Raspberry, Raspberry (leaves), Reishi, Restharrow, Rhodiola rosea, Riberry (*Syzygium luehmannii*), Rocket/Arugula, Roman chamomile, Rooibos, Rosehips, Rosemary (*Rosmarinus officinalis*), Rowan Berries, Rue, Safflower, Saffron, Sage (*Salvia officinalis*), Saigon Cinnamon, St John's Wort, Salad Burnet (*Sanguisorba minor* or *Poterium sanguisorba*), Salvia, Sichuan Pepper (*Sansho*), Sassafras, Savory (*Satureja hortensis, S. montana*), Schisandra (*Schisandra chinensis*), *Scutellaria costaricana,* Senna (herb), Senna obtusifolia, Sesame seed, Sheep Sorrel, Shepherd's Purse, Sialagogue, Siberian ginseng (*Eleutherococcus senticosus*), *Siraitia grosvenorii* (luohanguo), Skullcap, Sloe Berries, Smudge Stick, Sonchus, Sorrel (*Rumex* spp.), Southernwood, Spearmint, Speedwell, Squill, Star anise, Stevia, Strawberry Leaves, Suma (*Pfaffia paniculata*), Sumac, Summer savory, Sutherlandia frutescens, Sweet grass, Sweet cicely (*Myrrhis odorata*), Sweet woodruff, Szechuan pepper (*Xanthoxylum piperitum*), Tacamahac, Tamarind, Tandoori masala, Tansy, Tarragon (*Artemisia dracunculus*), Tea, *Teucrium polium,* Thai basil, Thistle, Thyme, Toor Dall, Tormentil, *Tribulus terrestris,* Tulsi (*Ocimum tenuiflorum*), Turmeric (*Curcuma longa*), Uva Ursi also known as Bearberry, Vanilla (*Vanilla planifolia*), Vasaka, Vervain, Vetiver, Vietnamese Coriander (*Persicaria odorata*), Wasabi (*Wasabia japonica*), Watercress, Wattleseed, Wild ginger, Wild Lettuce, Wild thyme, Winter savory, Witch Hazel, Wolfberry, Wood Avens, Wood Betony, Woodruff, Wormwood, Yarrow, Yerba Buena, Yerbe mate, Yohimbe, Za'atar, Zedoary Root, or derivations thereof in aqueous or semi-aqueous solution(s).

Hydration and Washing Step

In one embodiment, the cacao beans or other agricultural substrate are prepared for use in the instant methods of the invention, resulting in a prepared cacao bean or other agricultural substrate.

In some embodiments, the provided cacao bean or other agricultural substrate is not dried prior to being used in the processes of the instant invention. In this embodiment, after the cacao bean or other agricultural substrate is harvested, the cacao bean or other agricultural substrate optionally has the pulp removed by any processes known in the art (i.e., the cacao beans can be demucilaged), such as fermentation, or washing and mechanical hulling. Post-demucilaging, the cacao bean or other agricultural substrate can be used in the present invention without further treatment, such as drying. The pulp may also be retained. Generally, after a fermentation (demucilage) step, the cacao beans have a moisture content of about 55% to 60%. In this embodiment, the hydration and/or washing step as described below is not necessary or is obviated by the use of the undried cacao bean or other agricultural substrate. In some embodiments, the cacao bean or other agricultural substrate may be partially dried and subsequently hydrated as described herein.

In some embodiments, the cacao beans or other agricultural substrate are prepared by a step of hydrating the cacao beans or other agricultural substrate. Hydration is particularly useful where the cacao beans or other agricultural substrate have been dried. Hydration ensures that the substrates have optimal moisture content for the culturing (myceliation) process. Hydration may be accomplished by a number of methods known in the art.

The hydration may be accomplished by an aqueous medium. The aqueous medium includes water and optionally, additional excipients. Water may be, without limitation, filtered, ozonated, deionized, tap, distilled or mineralized. Other excipients can be added to the water, such as buffers to maintain a certain pH, sodium chloride, citric acid and/or ascorbic acid. The pH may be neutral or adjusted. The temperature of the aqueous medium may be room temperature, or elevated in temperature to accelerate the hydration process.

Hydration may be accomplished by allowing the cacao beans or other agricultural substrate to soak in the aqueous medium for any appropriate length of time, ranging from a few seconds or less to overnight. Cacao beans, for example, are fairly hygroscopic and will require less time to hydrate. The soaking step for the hydration and/or aqueous extraction step may be less than a second, at least five seconds, at least ten seconds, at least thirty seconds, at least a minute, at least five minutes, at least ten minutes, at least twenty minutes, at least thirty minutes, at least forty minutes, at least fifty minutes, at least an hour, at least an hour and a half, at least two hours, at least two and a half hours, at least three hours, at least four hours, at least five hours, at least six hours, at least seven hours, at least eight hours, at least ten hours, at least twelve hours, or at least fifteen hours, at least eighteen hours, at least twenty four hours, at least thirty six hours, or at least forty-eight hours. However, the time for the hydration step should be selected in view of the fact that the cacao beans or other agricultural substrate are not sterile and soaking for too long of a time may encourage the growth of undesirable organisms. The hydration time should be selected to optimize the substrate moisture content and molecular constituents of the cacao bean or other agricultural substrates.

The cacao beans or other agricultural substrate may be hydrated at any temperature that allows for effective hydration; in one embodiment, the temperature of the aqueous component temperature is room temperature. Hydration temperature should be selected in view of the fact that at high temperatures, desirable flavor components may be altered.

Hydration may be performed under normal atmospheric pressure or may be performed under increased pressures to accelerate the hydration process and/or aqueous extraction process, such as between 1 and 2 atmospheres, for example, at 1.5 atmospheres.

Moisture content of the hydrated cacao beans or other agricultural substrate is optionally between about 20% and about 80% moisture content, or between a 40% and 70% moisture content. In one embodiment, the moisture content is at least about 30%, at least about 50%, or at least about 60%. In one embodiment, for cacao bean, the moisture content is at least about 36%.

The hydration step may occur in a container by any method known in the art. In one embodiment, the container is a drum, such as a 55 gallon drum, or a 5-gallon bucket. In this embodiment, a volumetric 1:1 (equal volumes) ratio of cacao beans or other agricultural substrate:aqueous component are allowed to stand for 5 minutes to 24 hours. For example, the 55 gallon drum or 5 gallon bucket is filled half-way to the top with cacao beans or other agricultural substrate and aqueous medium is added to submerge the cacao beans or other agricultural substrate. In this embodiment, the cacao beans or other agricultural substrate may absorb the entire aqueous component. In another embodiment, the cacao beans or other agricultural substrate, held in a container, may be filled with water to completely submerge the beans, in one embodiment, without significant excess.

In one embodiment, the step of providing prepared cacao beans or other agricultural substrate optionally includes a step of removing undesirable taste components by washing or rinsing the cacao beans or other agricultural substrate. The wash or rinse may be conducted with the aqueous medium as described above. In one embodiment, the cacao beans or other agricultural substrate are optionally washed or rinsed prior to, during, or after the optional hydration step. Washing, draining and/or rinsing the cacao beans or other agricultural substrate can be performed by any method known in the art. The cacao beans or other agricultural substrate may be washed one time, at least two times, at least three times, at least four times, at least five times, at least ten times, at least fifteen times, at least twenty times, at least fifty times or more. In one embodiment the wash step is performed two times. The wash or rinse step may include optional soaking times as described herein.

In another embodiment, water is added to the container holding the provided cacao beans or other agricultural substrate, and the container with the cacao beans or other agricultural substrate is then heat-treated.

In one embodiment, the cacao beans or other agricultural substrate are washed by a method of filling a container holding the cacao beans or other agricultural substrate with water to submerge the cacao or other agricultural substrates, allowing the water to soak for 10 seconds to 4 hours, draining the water off and repeating the steps as many times as desired, or to raise the beans to the desired moisture level. The washing or rinsing step may also be carried out until the cacao beans or other agricultural substrate have had a determined amount of undesirable taste component removed.

The cacao beans or other agricultural substrate may be washed at any temperature that allows for the efficient extraction of undesirable taste components; in one embodiment, the temperature of the aqueous medium temperature is room temperature. Wash temperature should be selected in mind of the fact that at high temperatures, desirable flavor components may be altered, destroyed and/or extracted.

In another embodiment, the excess aqueous medium or component is removed and/or separated and/or drained from the hydrated cacao beans or other agricultural substrate after the hydration step. This step may also be referred to as an aqueous extraction step. This step may be done to remove undesirable taste components.

The hydration step, aqueous extraction step, wash and/or rinse step, individually or in combination, can optionally reduce and/or remove undesirable taste components from the cacao beans or other agricultural substrate and may be carried out as described herein until the desired amount of undesirable taste component has been removed from the cacao beans or other agricultural substrate.

In some embodiments, undesirable taste components are removed and include embodiments where 5% of undesirable taste components are removed; in other embodiments, up to 10%, up to 15%, up to 20%, up to 25%, up to 30%, up to 35%, up to 40%, up to 45%, up to 50%, up to 55%, up to 60%, up to 65%, up to 70%, up to 75%, up to 80%, up to 85%, up to 90%, or up to 95% of undesirable taste components are removed in the processes of the instant invention, including the rinse step. In some embodiments, about 25% to about 80% of the undesirable taste components are removed. In one embodiment, about 45 to 50% of the undesirable taste components are removed.

In some embodiments, determination of the extent of the removal of at least one undesirable taste component is determined by the appearance, taste and/or chemical composition (by methods known in the art) of the myceliated product. Alternatively, the cacao beans' or other agricultural substrate's appearance or chemical composition may be determined by known methods. This determination may be quantitative, e.g., the chemical composition of the myceliated product may be measured by assay methods, or determined qualitatively by taste testing by skilled persons.

In one embodiment, up to 5% of one or more of the undesirable taste components are removed; in other embodiments, up to 10%, up to 15%, up to 20%, up to 25%, up to 30%, up to 35%, up to 40%, up to 45%, up to 50%, up to 55%, up to 60%, up to 65%, up to 70%, up to 75%, up to 80%, up to 85%, up to 90%, or up to 95% of one or more of the undesirable flavor components are removed in the processes of the instant invention. In one embodiment, one or more of the undesirable flavor components are quantitatively removed.

In one embodiment, reduction of the desirable flavor components such as volatile oils is minimized by the processes of the present invention. In processing cacao beans or other agricultural substrate, the art teaches to steam treat, steam extract, or stream strip the cacao beans or other agricultural substrate prior to roasting, which can remove many desirable volatile oils. The processes of the instant invention avoid the steam roasting step for, thereby helping to preserve the desirable volatile oils that contribute to cacao flavor.

Sterilization/Pasteurization

The methods of the present invention further optionally comprise a method of heat treatment such as pasteurizing and/or sterilizing the cacao beans or other agricultural substrate. In one embodiment, the cacao beans or other agricultural substrate are sterilized to provide prepared cacao beans or other agricultural substrate. This step may be accomplished by any method known in the art. For example, this step may performed under atmospheric pressure or under increased pressure. This step may also be referred to as "pre-processing." This step is performed to reduce or remove undesirable microbial or fungal organism contaminants on the cacao beans or other agricultural substrate.

Methods for pasteurization and/or sterilization may be carried out as known in the art. As an example of pasteurization, cacao beans or other agricultural substrate may be subjected to dry heat treatment at atmospheric pressure at 145° F. to 190° F. for 30 to 90 minutes, OR alternatively at 140° F. to 210° F. for 20 to 100 minutes.

Sterilization of the cacao beans or other agricultural substrate may be performed as is known the art. For example, cacao beans or other agricultural substrate may be sterilized by heating under pressure at 15 lb/in$^2$ at 121 to 122° C. for 20 to 100 minutes, such as 90 minutes, and adding ¾ lb for every 1,000 ft above sea level. In another embodiment, the steam is superheated to 251 to 255° F. In one embodiment, cacao beans are sterilized for 80 minutes at 22 psi with slightly dry saturated steam at 255° F. Cacao beans or other agricultural substrate may be sterilized in a container. The container may optionally be the same container as the container used for the aqueous extraction and/or hydration step. The container may be optionally sealed and the cacao beans or other agricultural substrate may be sterilized by the application of heat to the exterior of the container. In one embodiment, the heat is provided by applying steam to the exterior of the container for a sufficient period of time to allow for sterilization of the contents. In another embodiment, steam is applied to the interior and exterior of the containing for a sufficient period of time to allow for sterilization of the contents.

The sealed container of some embodiments can provide some advantages. For example, sealing the container minimizes outflow of flavor components and aromatic components from the cacao beans or other agricultural substrate, which can be noticed by the lack of cacao beans or other agricultural substrate aroma from steam from the pressure cooker or autoclave during the sterilization process. Sealing also prevents water-soluble flavor and aromatic components from escaping the cacao beans or other agricultural substrate beans directly into steam, hot air, or heated water.

Suitable containers include containers known in the art for mushroom cultivation. Optionally the containers have a section for exchanging air or gases but do not allow passage of any other component. Such sections are known in the art and include filter strips. In one embodiment, the container is a food grade fermenter, for example, a 6,000 gallon stainless steel fermenter. In some embodiments, the containers of the instant invention can be glass, carbon and stainless steel drums, carboys, or polypropylene bags or drums. Fermenters and bioreactors can also be used as containers of the instant invention. In some embodiments, the containers have a means for gas exchange that precludes passage of contaminants, such as filter zones or valves. In one embodiment the container is a bag, for example, an autoclavable, polypropylene bag with filter strips, and a gamma-irradiated polyethylene bag with filter zones.

A further advantage of the bags described above is that when sealed, they conform to shape of the cacao beans or other agricultural substrate beans when pressurized during the sterilization step. Conforming the bags to the shape of the cacao beans or other agricultural substrate inhibits movement of the cacao beans or other agricultural substrate relative to each other, preventing or minimizing degradation of the surface of the beans or substrates. This conforming of the bag to the shape of the cacao beans or other agricultural substrate also improves heat transfer, as the lack of air prevents air insulation of the cacao beans or other agricultural substrate from heat. The bags can be of any dimension. In one embodiment, bags are elongated or flattened to hasten the heating process, for example, the length may be three times the diameter of the bag. This dimension may also facilitate the advantageous stacking of bags or positioning of bags for sterilization.

The size of the container or bags to be used can be chosen according to the volume or amount of cacao beans or other agricultural substrate to treat by the methods of the present invention. Exemplary amounts of cacao beans or other agricultural substrate to use per bag or container include 1 to 1000 kg of cacao beans or other agricultural substrate, although larger and smaller amounts of cacao beans or other agricultural substrate are contemplated.

In another embodiment, the bags are flattened, having a thickness of ⅒th or less than the sum of the peripheral edges of each bag. The bags can be round in shape, having a circumference that defines the peripheral edges of each bag. Alternatively, the bags can be rectangular so that the sum of the sides defines the peripheral edges of each bag. The bags can be conjoined so that a series of rectangular bags can be easily handled in a production environment. Bags optionally have breathable patches (filter strips) that provide for the approximation of an anaerobic environment. In yet another embodiment, the bags are flattened to hold a layer of beans being less than three beans thick. Accordingly, heat quickly penetrates the flattened bags to the beans to effectuate sterilization or pasteurization. In this embodiment, due to the pressurization, the bag will conform to the shape of the cacao beans or other agricultural substrate, and this will yield a pebbled surface on the outer surface of each bag when pressure is applied. The pebbled bag surface forms interstitial spaces that allow heat to penetrate between bags that are stacked to accelerate the sterilization or pasteurization process. The pebbled surface of the bags also induces turbulent fluid flow along the bag surface to improve heat transfer to the cacao beans or other agricultural substrate. In another embodiment, the cacao beans or other agricultural substrate are vacuum packed in the bags to eliminate air that could draw volatile flavor or aromatic components from the bags.

In another embodiment, the bags are replaced by sheets of autoclavable material, such as BPA-free plastic. One base sheet is continuously dispensed along the top of a conveyor, cacao beans or other agricultural substrates are then laid on the dispensed base sheet. A second top sheet is overlaid upon the cacao beans or other agricultural substrate and sealed to the base sheet. A vacuum is applied between the top and bottom sheet to evacuate air, then the sheets are sealed at predetermined distances to form sections. Each section holds a pre-determined volume of cacao beans or other agricultural substrate. The sections are conveyed through an autoclave, or oven, to effectuate the pasteurization or sterilization process. Heat may be applied in a pressurized or non-pressurized environment in the form of steam, hot water under pressure, hot air in turbulent or laminar flow over the sheets, or other heated fluid. In a variation of this embodiment, the sections containing the cacao beans or other agricultural substrate are rolled and placed in an autoclave for pressurization or sterilization. One roll can contain many sections.

Since the cacao beans or other agricultural substrate cause a pebbled surface on the exterior of the sheets, interstitial space exists on the outside surface of the sheets to hasten the pasteurization or sterilization process by allowing heated fluid to readily penetrate between sheets. The pebbled sheet surface also induces turbulent fluid flow that further improves heat transfer to the cacao beans or other agricultural substrate. The pebbled surface inhibits relative movement between the beans to assure that the cacao beans or other agricultural substrate do not crack, break or rub.

Fungal Component

The fungal component to use with the present invention can be a fungi from phylum *Basidiomycotina* of *Eumycota*, including any Fungi belonging to *Polyporaceae* and *Hericiaceae*, wherein Fungi selected from *Basidiomycota* of *Eumycota* include *Eumycota*, including at least one selected from *Basidiomycotina* and *Ascomycotina*, including the strains: *Hericium erinaceus, Pleurotus ostreatus, Pleurotus eryngii, Pleurotus citrinopileatus, Pleurotus djamor, Trametes versicolor, Lentinula edodes, Armillariella mellea, Tricholoma matsutake, Flammulina velutipes, Volvariella volvacea, Agaricus campestris, Agaricus blazei, Grifola frondosa, Pholiota nameko, Agrocybe cylindracea, Boletus edulis, Ganoderma lucidum, Ganoderma applanatum, Hypsizygus marmoreus, Morchella hortensis, Morchella angusticeps, Morchella esculenta, Phellinus linteus, Auricularia auricula, Tremella fuciformis, Inonotus obliquus, Fomes fomentarius, Laetiporus sulfureus, Bridgeoporus nobillismus, Cordyceps sinensis, Cordyceps militaris, Cantharellus cibarius* and/or, *Polyporus umbellatus*, and/or combinations thereof.

Generally, the invention does not contemplate use of the following fungi: *Rhizopus chinensis, R. oligosporus, Aspergillus flavusoryzae, A tamari, A. niger, A. nidulans, A. sojae, Fusarium venenatum, F. graminearum, Saccharomyces cerevisiae, S. exigous, S. pombe, Saccharomycopisis (Candida) lipolytica, Candida utilis, C. krusei* or *C. tropicalis, Pichia saitoi, Kluyveromyces fragilis, Endomycopsis fibuliger, Chaetomium* spp., *Zygosaccharomyces rouxii, Mucor racemosus, Geotrichum candidum, Penicillium camemberti, P. notatum, P. griseofulvuum, P. grisea, P. chrysogenum, P. roqueforti, P. nalgiovense, Neurospora intermedia, Amylomyces rouxii, Endomycopsis burtonii, Psycilocibin, Monascus purpureus, Debaryomyces hansenii, Ashbya gossypii, Blakeslea trispora, Tolypocladium niveum, T inflatum, Streptomyces, Neocosmospora, Stachybotrys, Beauveria, Cephalosporium acremonium, C. acremonium, Gibberella fujikuroi, Fusidium coccineum, Monascus ruber, Claviceps fusiformis, C. paspali, C. purpurea, Amanita muscaria,* or *A. phalloides.*

Fungal components useful in the present invention may be prepared by methods as described herein. For example, in one embodiment, a pure strain of fungus is used. In some embodiments, the pure strain of fungus is able to effectively grow on and/or myceliate the prepared cacao beans or other agricultural substrate to prepare the myceliated products. Any strain of fungus identified herein which is capable of effectively growing on and/or myceliating prepared cacao beans or other agricultural substrate can be used for the methods of the present invention.

Fungal components useful in the present invention may be prepared by methods as described herein. For example, in one embodiment, a pure strain of fungus is used. It was surprisingly found by the inventors of the instant invention that some fungal strains of a particular species have enhanced and/or increased ability to grow on, metabolize or otherwise utilize and/or modify cacao beans or other agricultural substrate and/or remove one or more undesirable taste components from the cacao beans or other agricultural substrate and/or better tolerate the presence of cacao beans or other agricultural substrate (or extract) in media. In one embodiment, the undesirable taste component is methylxanthines, such as theobromine and/or 2-methoxy-3-isopropylpyrazine. In another embodiment, the fungal component reduces or removes caffeine from cacao beans or other agricultural substrate.

Therefore, the methods of the invention have as an optional additional step a method of selecting a fungal component having an enhanced and/or increased ability to grow on, metabolize or otherwise utilize and/or modify cacao beans or other agricultural substrate and/or remove one or more undesirable taste components from the cacao beans or other agricultural substrate, and/or remove caffeine and/or better tolerate the presence of cacao beans or other agricultural substrate (or extract) in media. This method comprises screening a number of strains of a desired fungal species to select for a suitable fungal component (strain) which exhibits the enhanced and/or increased ability to grow on, metabolize or otherwise utilize and/or modify cacao beans or other agricultural substrate and/or remove one or more undesirable taste components and/or caffeine from the cacao beans or other agricultural substrate, and using these selected strains in the methods of the invention.

In one embodiment, a pure strain of any commercially available *Ganoderma lucidum* is used as the fungal component. While all strains of *Ganoderma lucidum* are effective for the present invention, it was surprisingly found that some selected strains have the enhanced abilities useful for the present invention as described herein. One such strain useful for the fungal component of the present invention is *Ganoderma lucidum* strain 806, (Alice Chen; Buffalo, N.Y.; 4/94) commercially available from Pennsylvania State University (The Pennsylvania State University Mushroom Culture Collection, available from the College of Agriculture Sciences, Department of Plant Pathology and Environmental Microbiology, 117 Buckhout Laboratory, The Pennsylvania State University, University Park, Pa., USA 16802). These selected strain(s) were deposited with ATCC as described hereinbelow This strain was surprisingly determined by the present inventors to more efficiently grow on, metabolize or otherwise utilize and/or modify cacao beans or other agricultural substrate and/or remove one or more undesirable taste components from the cacao beans or other agricultural substrate, and/or better tolerate the presence of cacao beans or other agricultural substrate (or extract) in media. In another embodiment, this strain can remove and/or reduce the amount of caffeine in cacao beans or other agricultural substrate. Therefore, in one embodiment, the fungal component is *Ganoderma lucidum* strain 806 Alice Chen; Buffalo, N.Y.; 4/94. These selected strain(s) were deposited with ATCC as described herein.

In one embodiment, a pure strain of any commercially available *Cordyceps sinensis* is used as the fungal component. While all strains of Cordyceps sinensis are effective for the present invention, it was surprisingly found that some selected strains have the enhanced abilities useful for the present invention as described herein. One such strain useful for the fungal component of the present invention is *Cordyceps sinensis* (Strain 1009 Caterpillar Fungus; Colorado Corp, 1/2014), commercially available from Pennsylvania State University (The Pennsylvania State University Mushroom Culture Collection, available from the College of Agriculture Sciences, Department of Plant Pathology and Environmental Microbiology, 117 Buckhout Laboratory, The Pennsylvania State University, University Park, Pa., USA 16802).

This strain was surprisingly determined by the present inventors to more efficiently grow on, metabolize or otherwise utilize and/or modify cacao beans or other agricultural substrate and/or remove one or more undesirable taste components from the cacao beans or other agricultural substrate, including methylxanthines, such as theobromine and/or 2-methoxy-3-isopropylpyrazine and/or better tolerate the presence of cacao beans or other agricultural substrate (or extract) in media. In another embodiment, this strain can remove and/or reduce the amount of caffeine in cacao beans or other agricultural substrate. Therefore, in one embodiment, the fungal component is *Cordyceps sinensis* (Strain 1009 Caterpillar Fungus; Colorado Corp, 1/2014). These selected strain(s) were deposited with ATCC as described hereinbelow.

Similarly selected strains for *Hericium erinaceus, Pleurotus ostreatus, Pleurotus eryngii, Pleurotus citrinopileatus, Pleurotus djamor, Trametes versicolor, Lentinula edodes, Armillariella mellea, Tricholoma matsutake, Flammulina velutipes, Volvariella volvacea, Agaricus campestris, Agaricus blazei, Grifola frondosa, Pholiota nameko, Agrocybe cylindracea, Boletus edulis, Ganoderma lucidum, Ganoderma applanatum, Hypsizygus marmoreus, Morchella hortensis, Morchella angusticeps, Morchella esculenta, Phellinus linteus, Auricularia auricula, Tremella fuciformis, Inonotus obliquus, Fomes fomentarius, Laetiporus sulfureus, Cordyceps sinensis, Cordyceps militaris, Cantharellus cibarius*, and/or *Polyporus umbellatus*, for example, (or for any species of fungi mentioned herein) were obtained by screening a number of strains of each species to select for a suitable fungal component (strain) which exhibits the enhanced and/or increased ability to grow on, metabolize or otherwise utilize and/or modify cacao beans or other agricultural substrate and/or remove one or more undesirable taste components and/or caffeine from the cacao beans or other agricultural substrate, and/or is better able to tolerate the presence of cacao beans or other agricultural substrate, and using this selected strain(s) in the methods of the invention. Therefore, in some embodiments, the selected strain(s) of the fungus identified herein are used in the processes of the instant invention. These selected strain(s) were deposited with ATCC as described hereinbelow.

Strains mentioned herein are publically available from The Pennsylvania State University Mushroom Culture Collection, available from the College of Agriculture Sciences, Department of Plant Pathology and Environmental Microbiology, 117 Buckhout Laboratory, The Pennsylvania State University, University Park, Pa., USA 16802, and from *Fungi Perfecti*, PO Box 7634, Olympia, Wash. 98507, USA.

All strains referenced herein are deposited with the ATCC at 10801 University Boulevard, Manassas, Va. 20110-2209 USA under the Budapest Treaty provisions. The deposit will irrevocably and without restriction or condition be available to the public upon issuance of a patent and will be maintained under the terms of the Budapest Treaty on the International Recognition of the Deposit of Microorganisms for the Purposes of Patent Procedure. These deposits were made merely as a convenience for those of skill in the art and are not an admission that a deposit is required under 35 U.S.C. § 112. However, it should be understood that the availability of a deposit does not constitute a license to practice the subject invention in derogation of patent rights granted by government action. The deposit will be maintained without restriction in the ATCC Depository, which is a public depository, for a period of 30 years, or 5 years after the most recent request, or for the enforceable life of the patent, whichever is longer, and will be replaced if it ever becomes nonviable during that period.

Maintenance and Adaptation of Fungal Component

Fungal components useful in the present invention may be prepared by methods as described herein. For example, in one embodiment, the fungal component is optionally grown, maintained and/or propagated in an undefined medium comprising cacao beans or other agricultural substrate extract prior to use for inoculation of the cacao beans or other agricultural substrate. In one embodiment, the fungal component is indefinitely maintained in the undefined medium comprising cacao beans or other agricultural substrate extract in the solid-state, floating, and submerged morphologies of various volumes.

Where the agricultural substrate is cacao beans, the extract of cacao beans may be replaced or spiked by flavor components of the cacao bean which are desired to be minimized, metabolized, reduced or removed. For example, cacao flavor components may be used, such as 2-methoxy-3-isopropylpyrazine and methylxanthines, such as theobromine, obtained commercially as chemical compounds, added to the media as a 0.1 M buffer solution through an in-line filtered syringe. The relative proportions of the flavor components can be adjusted or balanced in the media to achieve specific flavor profile goals.

Without being bound by theory, the inventors believe that maintenance of the fungal component on undefined media comprising cacao beans or other agricultural substrate plays an important role in the long-term viability and health of the fungal component. It is believed that the perpetual and subtle changes made from batch to batch of agar and liquid media when using undefined medium comprising cacao beans or other agricultural substrate effectively avoids the phenomenon of undesirable genetic drift that will occur over time to the fungal component when are maintained on identical (defined) media.

The undefined medium comprising cacao beans or other agricultural substrate extract may be made by a number of methods. In one embodiment, the undefined medium comprises pure aqueous cacao beans or other agricultural substrate extract. Optionally, additional energy sources can be added. Materials are optionally organic and water at least RO filtered. It has been surprisingly found by the inventors that the medium may comprise aqueous cacao or other agricultural substrate extract without any additional added excipients, such as an additional energy source for growing fungi of the present invention.

Solid media comprising undefined medium comprising cacao beans or other agricultural substrate extract. In one embodiment, undefined medium comprising cacao beans or other agricultural substrate agar media to grow fungi for the eventual purpose of myceliating sterilized cacao beans or other agricultural substrate can comprise filtrate of cacao beans or other agricultural substrate. In one embodiment, 0.1 to 100 lbs. of cacao beans or other agricultural substrate are in 0.1 to 100 L of water, respectively, for 1 minute to 12 hours. The filtrate was collected through 1 to 3 filtrations of the mixture, and 14 to 17 g/L of agar was added. The base extract solution can be used alone, or co-mixed with vegetable extracts and/or additional sugar sources such as fruit juice.

This base solution can be optionally mixed with the filtrate of undefined vegetable (of any type but ideally organic) aqueous extract, such as malt extract, yeast extract, potato, etc. In one embodiment the vegetable is potato. Aqueous potato mixture can be prepared by softening 1 to 300 g of potato mass in boiling or pressurized water, mashed, and the filtrate was collected through 1 to 3 filtrations. Optionally, fruit juice with no added sugars can also be added to the base cacao beans or other agricultural substrate agar media. In one embodiment, the medium comprises 0.1 to 10% by weight of malt extract, 0.1 to 10% by weight undefined vegetable extract with essence of cacao bean, 0.1 to 10% by weight of yeast extract, 0.1 to 10% by weight of peptone, 0.1 to 10% by weight of glucose, 20 to 80% by weight of water, and 1 to 90% by weight whole cacao beans or other agricultural substrate or green coffee bean extract.

As a non-limiting example of the media, for example, 2 lb cacao beans or other agricultural substrate, either pulverized or whole can be mixed with ¼ gallon water at room temperature. The mixture may be blended. The mixture is then allowed to extract for 20 minutes with shaking, then filtered three times through fine mesh. This solution can be used alone, or mixed with the following: about 5 organic potatoes are placed in 10 L of water and autoclaved 20 minutes to soften the potatoes. The potatoes are then pulverized with a potato masher, and then filtered through fine mesh three times. 1 L of commercial unsweetened fruit juice can be added. The potato extract is added to the cocoa extract and autoclaved.

In another embodiment, the media may comprise a chocolate liquor, which can be made by methods known in the art, such as obtaining a fine ground which is a liquid. The liquor can be used neat or can be diluted as desired. A chocolate liquor media should be agitated.

Once prepared, the media can be sterilized by any method known in the art. Once the media is cooled, can be poured into Petri plates and fungal cultures were propagated from plate to plate in sterile operation, as known in the art. Slants for test tubes and flasks may be prepared by this method. Petri plates can be inoculated with floating and submerged liquid tissue culture, and with myceliated substrate.

Liquid media undefined medium comprising cacao beans or other agricultural substrate extract. Cacao beans or other agricultural substrate extract, and undefined vegetable extract were prepared as described for solid media, except that no agar is added. If preparing to make a floating culture, 1 to 10 tablespoons of flour was added to the mixture, in one embodiment, about 1 tablespoon per 10 to 15 L of culture. The media can be sterilized by methods known in the art. Once cooled, the vessel can be inoculated in sterile operation with a colonized section petri plate, from other liquid tissue cultures, or from samples of myceliated substrate.

In one embodiment, the fungal component for inoculation into cacao beans or other agricultural substrate can be prepared by submerged liquid tissue culture using the undefined medium comprising cacao beans or other agricultural substrate extract liquid media as defined herein and agitated on a shaker table. In one embodiment, the agitation rate is 50 to 240 rpm, or 85 to 95 RPM, and incubated for 4 to 90 days. In one embodiment, the temperature of incubation is 87 to 89° F.

In one embodiment, the fungal component is trained and/or adapted and/or maintained in its ability to efficiently grow on, metabolize or otherwise utilize and/or modify cacao beans or other agricultural substrate. In one embodiment, the fungal component is selected and/or trained and/or adapted and/or maintained in its ability to remove or reduce one or more undesirable taste components from the cacao beans or other agricultural substrate or to remove or reduce the amount of caffeine. Methods to determine whether an undesirable taste component and/or caffeine has been reduced or removed has been disclosed herein and also be found in the art.

In one embodiment, the trained and/or adapted and/or maintained fungal component is prepared from disinfected wild and healthy fungi. Such fungi with changed, improved, and adapted properties as described herein, relative to the starting strains, either selected or unselected, were developed by these methods. These adapted strains were deposited with the ATCC as described elsewhere herein. In one embodiment, the trained and/or adapted and/or maintained fungal component is prepared from *Ganoderma lucidum*. In one embodiment, the trained and/or adapted and/or maintained fungal component is prepared from *Ganoderma lucidum* strain 806 Alice Chen; Buffalo, N.Y.; 4/94. In another embodiment, the trained and/or adapted and/or maintained fungal component is prepared from Cordyceps sinensis (Strain 1009 Caterpillar Fungus; Colorado Corp, 1/2014). In one embodiment, the trained and/or adapted and/or maintained fungal component is prepared from *Hericium erinaceus, Pleurotus ostreatus, Pleurotus eryngii, Pleurotus citrinopileatus, Pleurotus djamor, Trametes versicolor, Lentinula edodes, Armillariella mellea, Tricholoma matsutake, Flammulina velutipes, Volvariella volvacea, Agaricus campestris, Agaricus blazei, Grifola frondosa, Pholiota nameko, Agrocybe cylindracea, Boletus edulis, Ganoderma lucidum, Ganoderma applanatum, Hypsizygus marmoreus, Morchella hortensis, Morchella angusticeps, Morchella esculenta, Phellinus linteus, Auricularia auricula, Tremella fuciformis, Inonotus obliquus, Fomes fomentarius, Laetiporus sulfureus, Cordyceps sinensis, Cordyceps militaris, Cantharellus cibarius,* and/or *Polyporus umbellatus*. These fungi having changed, improved, and adapted properties as described herein, relative to the starting strains, were deposited with ATCC as described herein.

The training and/or adaption and/or maintenance step as described herein can be optionally conducted on undefined medium comprising cacao beans or other agricultural substrate extract liquid media or solid media as defined herein. In one embodiment, the fungi may be cultivated for 4 to 90 days at any temperature known in the art for cultivating fungi, for example, 87 to 89° F. Re-inoculation of the cultivated fungal component into fresh media as described herein can be performed at an appropriate time as determined by one of skill in the art depending on the growth rate, growth cycle, and appearance of the fungal component. The cycle of growth and re-inoculation of the fungal component into fresh media, in some embodiments, is performed more than one time, more than two times, more than three times, more than four times, more than five times, more than ten times, more than fifteen times, more than twenty times, more than twenty five times, more than thirty times, more than forty times, more than fifty times, more than seventy five times, or one hundred times or more. The fungal component by these methods can, for example, better recognize cacao beans or other agricultural substrate or any particular component of cacao beans or other agricultural substrate as an energy source, better tolerate the presence of cacao beans or other agricultural substrate extract in media (as measured by an enhanced growth rate, for example), better remove undesirable taste components, or better remove caffeine. In one embodiment, the undesirable taste component to be removed and/or reduced are catechins, methylxanthines, such as theobromine or 2-methoxy-3-isopropylpyrazine.

Therefore, the methods of the invention have as an optional additional step, a method of preparing a trained and/or adapted and/or maintained fungal component comprising a fungal component having an enhanced and/or increased ability to grow on, metabolize or otherwise utilize and/or modify cacao beans or other agricultural substrate and/or remove one or more undesirable taste components from the cacao beans or other agricultural substrate, and/or remove caffeine. Thus use of the trained and/or adapted and/or maintained fungal component is contemplated for the present invention. The methods of the invention further comprise use of any of the trained, adapted, and/or maintained fungal component(s) as described herein, in the methods of the instant invention.

Preparation of Fungal Component for Inoculation of Cacao Beans or Other Agricultural Substrate In one embodiment, methods for preparing the fungal component to inoculate the prepared cacao beans or other agricultural substrate include scaling up a fungal component as defined herein in liquid culture. Such fungal component which is readied for inoculation of the prepared cacao beans or other agricultural substrate is called a "prepared fungal component."

In one embodiment, the prepared fungal component is in solid culture. In another embodiment, the prepared fungal component is in liquid culture. In another embodiment the prepared fungal component is a mixture of solid and liquid culture. Liquid culture can be accomplished by any means known in the art and includes use of a bioreactor. For example, when using a bioreactor to prepare the fungal component, the bioreactor can be prepared by diluting undefined medium comprising cacao beans or other agricultural substrate extract liquid media up to 1000× with filtered/RO water. The jacket of the bioreactor may be steamed in one embodiment to sterilize the media, or alternatively, the media can be sterilized by way of injecting steam into the vessel.

The media to use in preparation of a fungal component for use to inoculate the prepared cacao beans or other agricultural substrate, may be any suitable media known in the art, or may be made by the methods disclosed herein. The media may further comprise trace elements and organic substances such as water, nucleic acids, and minerals. The media may be diluted up to 1000× with filtered/RO water. Dilution can be 1×, about 2×, about 3×, about 4×, about 5×, about 6×, about 7×, about 8×, about 9×, about 10×, about 15×, about 20×, about 25×, about 30×, about 35×, about 40×, about 45×, about 50×, about 55×, about 60×, about 65×, about 70×, about 80×, about 90×, about 100×, about 150×, about 200×, about 250×, about 300×, about 350×, about 400×, about 450×, about 500×, about 550×, about 600×, about 650×, about 700×, about 750×, about 800×, about 850×, about 900×, about 950× or about 1000×. In some embodiments, the dilution is about 5× to about 100×. For a 100 L bioreactor, media can be diluted about 10×, for example.

In one embodiment, to inoculate the reactor, media may be pumped from another reactor through a sterilized line with an inline pump, or creating positive pressure by sparging air into the reactor with an air compressor that runs the air through inline 0.2/0.5 micron capsule filters then through a check valve with a specific cracking pressure, for example, 2 to 3 psi.

Methods to inoculate the bioreactor to prepare the fungal component include inoculating the bioreactor with an excised colonized section of Petri plate and/or a sample of liquid culture using sterile procedure, or by pouring a floating or submerged liquid tissue culture into the bioreactor through the nozzle. Bioreactors can be inoculated in a non-clean space if they are connected to a valved off container containing a prepared glycerol stock, the container being connected to a steamable line that can be sterilized, cooled, and re-pressurized with sterile air before opening the line between the container and bioreactor.

Optionally, the fungal component may be agitated during culturing by methods known in the art. For example, in a bioreactor, the agitation may be accomplished by a combination of sparged air and a motorized paddle which allows both a turbulent environment and shear mechanical force. The inventors, without limitation, have found that the combination is superior to running either method individually, as sparged air creates the most turbulence at the top half of the culture, while affecting the bottom less, which can be kept agitated by a motorized paddle, while the paddle does not have to run at such a high RPM as normally used in the art. The combination creates the proper small hyphal sphere sizes without damaging the mycelia.

Liquid state fermentation agitation and swirling techniques are known in the art and include mechanical shearing using magnetic stir bars, stainless steel impellers, injection of sterile high pressure ambient air, injection at high-pressure of sterile media, and or the use of shaker tables. Higher agitation and swirling rates, in conjunction with air and media injections, produce small mycelial spheres.

The fungal component can be grown until ready for inoculation of the prepared cacao beans or other agricultural substrate as determined by one of skill in the art. In some embodiments, the fungal component can be grown for 48 hours prior to use in inoculating the cacao beans or other agricultural substrate. Determination of whether the fungal cultures comprising the fungal component are suitable for inoculation of the prepared cacao beans or other agricultural substrate can be determined by one of skill in the art. For example, in one embodiment, the fungal culture, when in liquid media, is suitable for inoculation while in exponential growth phase, either early or late. Senescent cultures and cultures in earlier growth phases with lower amounts of mycelia/mL can be used, but are not preferred. The prepared fungal component optionally appears well grown through in the media, with visible mycelia growing through every mL visible by microscope and unassisted vision.

In order to effect the most efficient myceliation of the cacao beans or other agricultural substrate, the fungal component have defined hyphal sphere sizes which enables hyphae growth in three dimensions around the spherical conglomeration of the culture of the fungal strain. In one embodiment the hyphal sphere size is less than 10 mm in diameter, less than 2 mm in diameter, less than 1 mm in diameter, less than 100 μm in diameter, less 10 μm in diameter, less than 5 μm in diameter, less than 2 μm in diameter, or less than 1 μm in diameter. In another embodiment, the hyphal spherical conglomeration has a size range of 5 μm to 1 μm in diameter, or, a size range of 10-50 μm in diameter.

These methods result in a prepared fungal component for inoculation of prepared cacao beans or other agricultural substrate.

Inoculation and Myceliation of the Prepared Cacao Beans or Other Agricultural Substrate The prepared cacao beans or other agricultural substrate are inoculated with the prepared fungal component. The prepared fungal component to be used can be any fungal component as defined in the instant invention. The inoculation of the prepared fungal component onto the prepared cacao beans or other agricultural substrate can be carried out by any method known in the art. This step may be variously referred to as the culturing step, the fermentation step, and/or the myceliation step.

The myceliation may take place in a container as described herein. In one embodiment, the myceliation takes place in a 55 gallon drum as described herein. In this embodiment, the 55 gallon drums has a lid containing two ports, and one port can be used as an inoculation port, while the other can be used to sparge in filtered air to the bottom of the culture, and another port to serve as a vent. In some embodiments, the inoculation port is a quick disconnect socket, which is attached to a quick disconnect plug at the end of a harvesting line during inoculation. Optionally, prepared cacao beans or other agricultural substrate in a plurality of drums can be myceliated in one cycle via a sterilized manifold connected to bioreactor harvesting line, with the included infrastructure to target any drum in singular or all together at once. In one embodiment, a system for volumetrically consistent dispensing of inoculant per culture is used.

In one embodiment, the culture may be pneumatically injected into a container comprising the prepared cacao beans or other agricultural substrate. Moisture may optionally be injected into bags to optimize mycelial growth. In another embodiment the cacao beans or other agricultural substrate are inoculated by pouring the culture into the container holding the sterilized cacao beans or other agricultural substrate either manually or through a valve built into the fermenter or bioreactor, from any variety of liquid tissue culture.

In one embodiment, the prepared cacao beans or other agricultural substrate are cooled to a temperature of between 80 to 100° F. prior to inoculation with the prepared fungal component. Cooling may be accomplished by refrigeration or at room temperature. The step of myceliating the prepared cacao beans or other agricultural substrate can take place for between 4 and 90 days, for between about seven and twenty one days, and in one embodiment, for about seven days, and at any temperature, for example, at 87 to 89° F. Multiplication of the fungal mycelia by fermentation is carried out by efficiently controlling environmental light, such as by a control model of 40% lighting and 60% dark, and also by controlling sterile airflow and temperature at 86 to 88 or 87 to 89° F., or between 12 to 35° C., or between 24° C. to 32° C.

Relative humidity of this culturing, myceliation and/or fermentation is between 20% and 80%, in some embodiments, at least about 60%. In some embodiments, the relative humidity is at least about 36 and 40%.

In an alternate embodiment, prior to addition of the fungal component, the cacao beans are prepared for liquid myceliation (fermentation) culture. The cacao beans are ground into fine particles, preferably, less than 1 mm in diameter as approximate particle size. In one embodiment, the particles are 20 to 50 μm in size. The cacao beans are then placed into aqueous solution that has a viscosity regulated or adjusted to suspend the cacao particles. Preferably, the aqueous solution has a viscosity adapted to the cacao particle size to enable the cacao particles to be suspended in the aqueous solution when agitated. The aqueous media containing the fungal component and the cacao particles can be deposited in a bioreactor of any size. Preferably the bioreactor is sized to hold at least 10 liters of aqueous media. More preferably, the bio-reactor is sized to hold several thousand liters, or more.

In one embodiment, the liquid myceliation culture is agitated. The agitation means is regulated to optimize the aqueous solution to maintain the mass of fungal mycelium in small particles. Preferably the fungal mycelium will have hyphal spheres, or conglomerations, having sizes that are between 1 to 100 μm in diameter. In another embodiment, the hyphal conglomerations are smaller than the particle size of the cacao.

In liquid myceliation culture, the bio-reactor is maintained at a suitable temperature and pressure to enable the mycelium to digest components of the cacao in a facultative anaerobic environment. After the mycelium has digested components of the cacao to remove bitter flavor components, the cacao is separated from the aqueous solution. This can be done by ceasing agitation and allowing the cacao to precipitate. This can also be accomplished by filtering the cacao from the aqueous solution. After the cacao is removed from the aqueous solution, it may be prepared for processing (including drying the cacao into a powder). A secondary step is optionally performed to extract the aqueous solution after removal of the cacao. This extract can be used to recover water-soluble flavor components of the cacao. These water-soluble flavor components may be processed and may be added back to the cacao either as a powder or an aqueous spray or bath. Cacao powder is the result. Supplemental flavor is added, as needed, to further improve the flavor of the cacao. For example sweeteners or cacao flavor extracts may be added at this juncture in the process.

Accordingly, the cacao is ready to form into any cacao product, for example, chocolate.

The step of myceliating the prepared cacao beans or other agricultural substrate is preferably accomplished in an aerobic, anaerobic or semi-anaerobic environment. Methods known in the art can be used to optionally induce and/or maintain facultative anaerobic metabolic activity of the prepared fungal component as described by the Pasteur effect. In an alternate embodiment, the cacao beans or other agricultural substrate are deposited in large stainless steel fermenters in a non-sterile environment. The fermenters regulate sterile-air concentration, humidity, and temperature, and optionally enable the facultative anaerobic activity and mycelial growth on the prepared cacao beans or other agricultural substrate. Facultative anaerobic activity metabolizes more cellulose of per unit of time, meaning that the cacao beans or other agricultural substrate substrate is consumed at a more rapid rate than in an aerobic environment. In some cases mycelial growth is nine times faster than in an aerobic environment (that is, nine times more cellulose molecules are metabolized to ATP). Another benefit is that the anaerobic environment inhibits fruiting body growth. An anaerobic environment also assures a reduction in unwanted bacterial growth, and other unwanted microbial growth.

Expansion of the fungus mycelia is monitored by microscopy, and schedules of growth documented by photography.

The longer the incubation period, the greater the production of the mycelium dry weight and the greater the flavor enhancement of the cacao beans or other agricultural substrate. Some strains will form primordial tissue and fruit bodies by 30 days (*Hericium erinaceus* is particularly prone to fruiting while in culture, as is *Ganoderma lucidum* and *Flammulina velutipes*). In some embodiments, harvesting the myceliated cacao beans or other agricultural substrate beans is performed before the culture fruits body tissue. However, a prolonged period of incubation of a specific fungus does not guarantee a high production of metabolite or the accumulation of mycelia and/or myceliation products.

Determination of when to harvest the myceliated product may be determined by a number of methods. Harvesting is generally performed with a timing to optimize the taste profile of the myceliated product according to the taste profile desired. For example, the scent profile of the myceliation culture can be used by the trained person to determine when the culture is ready. Determination of the appearance of the culture may also be done by the trained person. In some embodiments, harvesting can be done when the amount of the mycelia in the culture are in the approximate amount of 2 to 3 fully grown (standard size) Petri plates (for

*G. lucidum*), or when the amount of the mycelia are in the approximate amounts of 10 to 12 fully grown standard Petri plates (for *C. sinensis*), per 8 lb of cacao beans or other agricultural substrate. Analytical methods of analysis including high performance liquid chromatography, mass spectroscopy, and/or NMR may be employed to carry out measurement of total biomolecules in order to determine the optimum composition and cultivation conditions and the appropriate time(s) for harvesting the fungi.

In a non-limiting example of the present invention, about 8 lb of prepared cacao beans or other agricultural substrate according to the processes of the invention, in a sealed container as described herein, was inoculated with about 400 ml of prepared *I. obliquus* fungal component as described herein. An aerobic environment was obtained. The myceliation or culturing was allowed to proceed for seven days at 87 to 89° F., although as little as four days or as long as sixty or more days is also suitable. Harvesting was performed when observers determined that an appropriate taste profile for the myceliated product had been obtained.

Reduction of Undesirable Taste Components During Myceliation

Cacao beans and other agricultural substrates may contain undesirable taste components. Such undesirable taste components may be defined or undefined. In one embodiment, undesirable taste components include, for example, catechin, epicatechin, gallic acid equivalents, 2-methoxy-3-isopropylpyrazine, and methylxanthines such as theobromine One embodiment of an undesirable taste component includes 2-methoxy-3-isopropylpyrazine. This component is metabolized by the fungal component into polysaccharides, such as fungal (1–>3)(1–>6) β-glucan. Other undesirable taste components include bitter taste components. One such bitter component is methylxanthines, such as theobromine, and catechin. Myceliating raw cacao yields a cacao bean that is less bitter that raw cacao that is not myceliated.

Myceliation of cacao also causes the shell of the bean to be more easily winnowed for advantages in processing the cacao beans. It also results in a chocolate product that is much less prone to blooming The step of culturing or myceliation may also cause reduction and/or removal of undesirable taste components as described herein and/or caffeine. In some embodiments, determination of the extent of the removal of at least one undesirable taste component is determined by the appearance, taste and/or chemical composition of the myceliated product as is known in the art. This determination may be quantitative, e.g., the chemical composition of the myceliated product may be measured by assay methods for one or more of the undesirable taste components by assay methods as known in the art, or determined qualitatively by taste testing by skilled persons.

In one embodiment, up to 5% of one or more of the undesirable taste components are removed; in other embodiments, up to 10%, up to 15%, up to 20%, up to 25%, up to 30%, up to 35%, up to 40%, up to 45%, up to 50%, up to 55%, up to 60%, up to 65%, up to 70%, up to 75%, up to 80%, up to 85%, up to 90%, up to 95%, or up to 99.99% of one or more of the undesirable flavor components are removed in the processes of the instant invention. In one embodiment, one or more of the undesirable flavor components are quantitatively removed. The invention also relates to myceliated products having reduced levels of undesirable taste components as described herein.

In one embodiment, up to 10%, up to 15%, up to 20%, up to 25%, up to 30%, up to 35%, up to 40%, up to 45%, up to 50%, up to 55%, up to 60%, up to 65%, up to 70%, up to 75%, up to 80%, up to 85%, up to 90%, or up to 95% of undesirable taste components are removed in the processes of the instant invention.

In one embodiment, the undesirable taste component is 2-methoxy-3-isopropylpyrazine, and up to 5% of 2-methoxy-3-isopropylpyrazine is removed; in other embodiments, up to 10%, up to 15%, up to 20%, up to 25%, up to 30%, up to 35%, up to 40%, up to 45%, up to 50%, up to 55%, up to 60%, up to 65%, up to 70%, up to 75%, up to 80%, up to 85%, up to 90%, or up to 95% of 2-methoxy-3-isopropylpyrazine is removed in the processes of the instant invention. The invention also relates to myceliated cacao products having reduced levels of 2-methoxy-3-isopropylpyrazine as described herein.

In one embodiment, the undesirable taste component are methylxanthines such as theobromine, and up to 5% of methylxanthines such as theobromine are removed; in other embodiments, up to 10%, up to 15%, up to 20%, up to 25%, up to 30%, up to 35%, up to 40%, up to 45%, up to 50%, up to 55%, up to 60%, up to 65%, up to 70%, up to 75%, up to 80%, up to 85%, up to 90%, or up to 95% of methylxanthines such as theobromine are removed in the processes of the instant invention. The invention also relates to myceliated cacao products having reduced levels of methylxanthines such as theobromine as described herein.

In one embodiment, caffeine is removed from the cacao beans or other agricultural substrate during the culturing or myceliation step. In one embodiment, up to 5% of caffeine is removed; in other embodiments, up to 10%, up to 15%, up to 20%, up to 25%, up to 30%, up to 35%, up to 40%, up to 45%, up to 50%, up to 55%, up to 60%, up to 65%, up to 70%, up to 75%, up to 80%, up to 85%, up to 90%, or up to 95% of caffeine is removed in the processes of the instant invention. The invention also relates to myceliated products having reduced levels of caffeine as described herein.

Removal of undesirable taste components may allow for increasing the value of poorer quality cacao or other agricultural products and/or rendering it more edible. Myceliated products produced by this method may be used to blend with less expensive cacao beans or other agricultural substrate leading to a lower cost product having improved taste properties. The amount of sugar, milk and substitutes thereof to be added to the myceliated products may be reduced. The instant methods lead to enhanced flavor profile of the myceliated products due to a perception that the myceliated products provide a richer, smoother, and/or sweeter food with less bitter, harsh, and/or acidic tastes.

Addition of Flavor and/or Health Promoting Components

The culturing or myceliation processes of the instant invention, in some embodiments, provide a myceliated cacao beans or other agricultural substrate product with added flavor and/or heath promoting components. For example, the myceliated cacao beans or other agricultural substrate products may contain exogenously added anti-tumor and immunomodulatory health promoting components.

Fungi are metabolically similar to animals but structurally similar to plants in that they possess a rigid cell wall formed largely of long sugar molecule chains joined by somewhat difficult to digest beta (β-) linkages and to a smaller extent more easily digestible alpha (α-) linkages in conjunction with membrane-bound proteins. In contrast, plant cell walls (such as cacao beans or other agricultural substrate) are made of cellulose polysaccharides whose (1–>4) β-glycosidic glucose linkages are non-digestable by humans, but are digestable by fungi. Fungi cell walls are primarily composed of (1–>3) β-glycosidic linkages, with (1–>6) linked side chains, and chitin, and therefore may be broken down by minimal processing using water, heat and mechanical treatment into smaller, more easily digestible, immunologically-active polysaccharide molecules of variable microparticulate size called β-glucans, and related glycoprotein compounds. The immune response to β-glucan is dependent upon α- or β-glucan side chain structure, which has primary, secondary, and chiral tertiary structures, explaining the differences in immune response to each fungi's unique α- and or β-glucan profile. Thus, myceliated cacao beans or other agricultural substrate products have added health promoting components including the molecules described above. Other health promoting components present in the myceliated cacao beans or other agricultural substrate products may be components that have various properties such as immunomodulating, anti-aging, aphrodisiac, anti-tumour, anti-viral, anti-bacterial, and or anti-fungal properties and include compounds such as α- and β-glucans, glycoproteins, proteins, ergosterols, sterols, triterpenes, and fatty acids, glucomannan, riboglucan, sterpuric acid, mannitol, ribitol, guanosine and adenosine.

Methyl pyrazines, which develop naturally in cacao, are among the most important desirable flavor compounds found in cacao. In the presence of heat, such as roasting, they are produced through Maillard reactions i.e. between sugars and amino acids or peptides. Without being bound by theory, it is believed that methyl pyrazines are also be produced through fermentation and/or myceliation, which leads to increased and/or altered methyl pyrazines in myceliated cacao beans and other agricultural products. Using this method of manufacture of cacao, a single strain of fungi decomposes the cellulose, alkaloid, fat, and protein content contained in the prepared cacao beans and changes the substance structure and concentration of the cacao beans. On the other hand, a uniform and consistent quality of cacao is obtained by this invention's method of fermentation for processing raw cacao beans. By utilizing methods disclosed herein induced by this clean fermentation process, the flavor of raw cacao beans is enhanced, making the resulting cacao much richer, smoother, sweeter, and unique (compared to plain cacao made from non-myceliated beans).

The reactive carbonyl group of the sugar reacts with the nucleophilic amino group of the amino acid, and forms a complex mixture of poorly characterized molecules responsible for a range of odors and flavors. This process is accelerated in an alkaline environment (e.g., lye applied to darken pretzels), as the amino groups are deprotonated and, hence, have an increased nucleophilicity. The type of the amino acid determines the resulting flavor. This reaction is the basis of the flavoring industry. At high temperatures, acrylamide can be formed.

*Agaricus blazei* may be used for addition of unique α- and β-linked glucans called glucomannan and riboglucan, which are antiviral, into the myceliated cacao beans or other agricultural substrate product. Other *A. blazei* polysaccharide extracts may have anti-cancer effects and may be co-therapeutic with other mycelial extract of Fungi listed herein. Methods to optimize biomass and extracellular polysaccharide production have been reported. Therefore, myceliation with *A. blazei* and myceliated cacao beans or other agricultural substrate products containing flavor and/or health promoting components derived from *A. blazei* as described herein are also included in the instant invention.

*Cordyceps sinensis* produces cordycepic acid, adenosine, D-mannitol, and cordycepinadenosine which are immuno-modulating and anti-viral. *C. Sinensis* extracts have been shown to be anti-aging and aphrodisiacal. Mycelial sterols isolated from *C. sinensis* have been shown to inhibit the proliferation of numerous cancer cell lines. *C. sinensis* mycelial polysaccharide extracts have been shown to induce hypoglycemia. Therefore, myceliation with *C. sinensis* and myceliated cacao beans or other agricultural substrate products containing flavor and/or health promoting components derived from *C. sinensis* as described herein are also included in the instant invention.

*Flammulina velutipes* mycelium has been shown to have a polysaccharide profile that is immunomodulating. *F. velutipes* mycelium composes a unique ergosterol and amino acid profile, sterpuric acid, mannitol, ribitol, and the nucleosides guanosine and adenosine, Enokipodins A-D extracted from *F. velutipes* mycelium are broad spectrum antimicrobial terpenes. The proteins flammulin and velutin exhibit anti-HIV and anti-HPV activity. Therefore, myceliation with *F. velutipes* and myceliated cacao beans or other agricultural substrate products containing flavor and/or health promoting components derived from *F. velutipes* as described herein are also included in the instant invention.

*Ganoderma lucidum's* polysaccharide profile has been shown to be immunomodulating in human cell lines and also in clinical studies. *G. lucidum* mycelial extracts have anti-peroxidative, anti-inflammatory, and anti-mutagenic properties. *G. lucidum* extracts have been shown to be anti-aging and aphrodisiacal. The triterpenoid profile of *G. lucidum* has been determined and shown to be anti-hepatotoxic and hepatoprotective, anti-tumor, anti-angiogenic, anti-hypertensive, hypocholesterolemic, anti-histaminic, and anti-HIV. *G. lucidum,* in addition to producing polysaccharides and glycoproteins, likewise produce triterpenes, such as ganoderic and lucidenic acids, phenolic compounds, and sterols which also have high biological activity and therapeutic properties and are in themselves anti-oxidant, anti-tumor, anti-bacterial, anti-cancer, anti-inflammatory, anti-histamine, hypotensive, sedative, and meditative after oral consumption. Therefore, myceliation with *G. lucidum* and myceliated cacao beans or other agricultural substrate products containing flavor and/or health promoting components derived from *G. lucidum* as described herein are also included in the instant invention.

*Grifola frondosa's* polysaccharide profile has been shown to be immunomodulating and anti-oxidative, *G. frondosa* produces ergosterols and an anti-oxidative profile of fatty acids. The anti-tumor effects of *G. frondosa* extracts on in vitro cancer cell lines have been investigated, and shows promise for diabetes patients as being hypoglycemic. Therefore, myceliation with *G. frondosa* and myceliated cacao beans or other agricultural substrate products containing flavor and/or health promoting components derived from *G. frondosa* as described herein are also included in the instant invention.

*Hericium erinaceus* mycelial and fruiting body extracts have been shown to be anti-mutagenic and immunomodulatory across various cell lines. *H. erinaceus* uniquely produces hericenones in fruit bodies and erinacines in mycelium, structurally determined compounds that can pass the blood-brain bather and promote secretion of Nerve Growth Factor (NGF) in certain regions of the brain. Erinacenes have been shown to be greater potentiators of NGF expression than hericenones. Therefore, myceliation with *H. erinaceus* and myceliated cacao beans or other agricultural substrate products containing flavor and/or health promoting components derived from *H. erinaceus* as described herein are also included in the instant invention.

Aspects of *Lentinula edodes'* polysaccharide profile has been determined and shown to be immunomodulating and antiviral. Lentinan and other metabolites have been studied for their numerous health care benefits. In some countries, lentinan is classified as an "antineoplastic polysaccharide" and is available for clinical use. Addition of lentinan to standard cancer therapies has been shown to result in increased tumor necrosis and with hepatocellular carcinoma and improved quality of life in patients with esophageal carcinoma. Therefore, myceliation with *L. edodes* and myceliated cacao beans or other agricultural substrate products containing flavor and/or health promoting components derived from *L. edodes* as described herein are also included in the instant invention.

*Phellenis linteus* extracts have been shown to exhibit antitumor activity. *Polyporus umbellatus* polysaccharide extracts have been studied and shown to be anti-cancer, immunomodulating, anti-malarial, and hepatoprotective. *Inonotus obliquus* mycelial polysaccharide extract has demonstrated anti-tumor, hypoglycemic, and anti-oxidative properties. *Pleurotus ostreatus* mycelium and fruit body composition have been shown to be very similar, differing only in amino acid content. The mycelial polysaccharide profile consists primarily of laminarin, the extract of which has been shown to be immunomodulating. Lovastatin, isolated from the mycelial broth of *P. ostreatus*, exhibits anti-carcinoma activity, inhibits growth of bacteria and Fungi, and lowers cholesterol. *Trametes versicolor* produces heteroglucans with $\alpha$-(1-4)- and $\beta$-(1-3) glycosidic linkages with fucose in PSK (Krestin) and rhamnose and arabinose in PSP, have been shown to be anti-tumor and immunomodulatory. PSK, an approved drug, is a protein which exhibits immunomodulating, anti-viral, and cholesterol regulating properties. Mycelial polysachharide extracts of *Tremella fuciformis* have been shown to be therapeutic for various circulatory disorders, to be neurologically healthy, anti-carcinoma, anti-tumor, and anti-aging.

Therefore, myceliation with *Phellenis linteus, Polyporus umbellatus, Inonotus obliquus, Pleurotus ostreatus, Trametes versicolo,* and/or *Tremella fuciformis* (and any other fungal species described herein)and myceliated cacao beans or other agricultural substrate products containing flavor and/or health promoting components derived from *Phellenis linteus, Polyporus umbellatus, Inonotus obliquus, Pleurotus ostreatus, Trametes versicolor,* and/or *Tremella fuciformis* (or any other fungal species described herein) are also included in the instant invention.

The amounts of flavor components or health promoting components added by the fungal component as described herein can be estimated by one of knowledge in the art, and includes up to 1 ng of the component per unit myceliated cacao beans or other agricultural substrate product, or up to 5 ng, up to 10 ng, up to 50 ng, up to 100 ng, up to 500 ng, up to 1 µg, up to 5 µg, up to 10 µg, up to 50 µg, up to 100 µg, up to 500 ug, up to 1 mg, up to 2 mg, up to 5 mg, up to 10 mg, up to 20 mg, up to 50 mg, up to 100 mg, or up to 500 mg per unit myceliated cacao beans or other agricultural substrate product. A unit of myceliated cacao beans or other agricultural substrate product can be variously defined as 1 g, 1 lb, 1 kg, and the like.

Further Processing of Myceliated Product

In some embodiments, once fully myceliated, the myceliated cacao beans or other agricultural substrate product is optionally rinsed after myceliation. Rinsing may be performed to remove some or all parts of the mycelia and/or other non-cacao beans or other non-agricultural substrate matter.

In some embodiments, one fully myceliated, the myceliated product is optionally dried. Drying can be accomplished by means known in the art for drying cacao beans or other agricultural substrate. For example, myceliated product may be spread on a dry surface to dry. In one embodiment, the myceliated product is dried down to about an 8 to 9% moisture content.

Optionally, the dried or undried myceliated product can be roasted and/or toasted by conventional methods known in the art. The optional roasting step provides for deactivating the fungus, which may be desirable to reduce the risk of mycoses.

Myceliated cacao can be subjected to known processing steps non-myceliated cacao. Accordingly the present invention can be used to make myceliated cacao mass, myceliated cacao butter, myceliated chocolate liquor, and all forms of chocolate derived thereof, as done by tempering, and other methods known in the art. The added benefits of such food processing involve the unique nutritional profile (primarily the polysaccharide and metabolite profile) imbued into these foods by the myceliation.

In one embodiment of the invention, myceliated cacao bean extract is used for nutraceuticals in an extract form, or in a powdered form achieved from dehydrating the extract. In another embodiment the myceliated cacao bean extract is used as an additive in functional foods to bolster flavor and nutrient content. This extract can be in aqueous form, infused in an alcohol base, or in vegetable glycerin, for example. A powdered form can be achieved from dehydrating the extract. The powdered form can be added to any packaged food. An example of a functional food includes a bottled drink, a snack bar, or a high-protein powder mixture used to make protein shakes. The powdered form can also be used in ice-cream.

The myceliated product may optionally be extracted to prepare an extract for use in food and/or drink products. For example, 1000 g of myceliated roasted cacao bean or agricultural substrate may be fully extracted, with agitation; using 10 to 1000 ml of 121 to 122° C. pressurized water as a buffer, containing 0.01% to 10% citric acid and 0.01 to 10% ascorbic acid. The resulting aqueous extract may be further purified and concentrated using conventional methods. Myceliated cacao bean or agricultural substrate product extracts may be given an extended shelf life by methods known in the art such as formulation in 18% to 24% alcohol, 45% to 60% glycerol, or addition of 2.5 X volumes of honey or similar sugar such as maple syrup or evaporated cane sugar.

Myceliated cacao tastes sweeter than natural cacao because mycelium removes bitter components from the bean. Accordingly, one benefit of using the myceliated cacao in functional foods is that a low sugar (or low sweetener) version of any functional food including cacao can be made to taste as good as compared with natural cacao having more sweeteners (i.e. sugar, stevia, or synthesized sweeteners). Also, myceliated cacao was found to be more alkaline than conventional cacao (unmyceliated), which provides advantages for digestion and health for the consumer.

The following examples are provided for illustrative purposes only and are not intended to limit the scope of the invention.

EXAMPLES

Example 1

Specific and pure strains of fungi obtained from referenced collections were manipulated in sterile environments in 1 to 10 gal plastic bags, 1 qt to 1 gal glass jar, or on 10 cm to 15 cm petri plates, using undefined, organic fruit and vegetable-based media including green cacao beans or other agricultural substrate extract with 1.5% agar (w/v), in order to monitor and ensure the general vigor and health of strains.

Mycelial samples were grown in a gentle, ambient sterile airflow for 2 to 4 weeks, then excised from Petri plates and subsequently used for inoculation into liquid-state fermentation employing a similar undefined fruit and vegetable-based media (but with no agar), using ambient air, in 1 qt to 1 gal glass jars. Some samples were grown in agitated and some were grown in unagitated cultures in ambient air in stainless steel tanks designed for commercial beer brewing and/or fermentation, or custom designed.

The unagitated liquid state fermentation formed a floating mass of hyphae which exhibited continuous growth at interface of liquid and air. The mycelium of agitated and/or swirling cultures grew very quickly as hyphal spheres, which being hydrated, remained submerged, and had the appearance of gelatinous beads in small diameter. Hydrated hyphal spheres collapsed upon desiccation, wherein they were used for inoculating Petri-plates for strain propagation and quality control.

Sphere diameter in liquid-state fermentation was found to be inversely proportional to agitation intensity and volume. Hyphal shear became more efficient at higher agitation and swirling intensity, and once sheared, hyphae formed new spheres of smallest possible diameter, growing in size until they sheared again. When employed in continuous liquid-state fermentation, there existed a constant ratio of sphere diameters, and therefore a constant supply of spheres on the order of microns was produced.

Thus, this example demonstrated that mycelia sphere diameter was manipulated for more efficient inoculation with inoculation efficiency being inversely proportional to sphere diameter.

Example 2

Mycelial cultures from unagitated liquid state fermentation (growth period of 2 to 4 weeks) formed a floating mass of hyphae, which were gently blended with a sharp, sterile cutting device prior to being used for inoculation. Gentle blending was achieved by mixing or low homogenization in a commercial blender in short bursts at slow speeds. Aliquots of blended liquid-state culture were used to inoculate sterilized unprocessed fruits and or vegetables, cereal grains, and/or culinary seed, or pasteurized culinary spice, medicinal herbs, natural flavorings, tea mixes, green vanilla beans, green cacao beans, and cacao beans or other agricultural substrate.

Example 3

Substrates for myceliation (containing both substrate and inoculated mycelial culture) in jars or bags were gently mixed every few days until they commanded the substrate and became somewhat resistant to mixing or shaking, usually 2 to 4 weeks depending upon strain. The products were then in a tempeh form. The myceliated green vanilla beans were cooked or baked; the myceliated green cacao beans were baked or toasted; and the myceliated cacao beans or other agricultural substrate were toasted or roasted. Myceliated grain presented in tempeh form, or as an ingredient in food(s) including soups, stir fries, breads, and meat-substitutes, was made safe to eat, and bio-available, by cooking on low to medium heat, 145° F. to 165° F., for 10 min to 60 min, at some point prior to consumption. Other cultures in jars or bags, such as herbs and spices were dried at 100° F. to 145° F. for 1 h to 24 h, packaged and used conventionally.

Myceliated honey formulations were stirred for 10 min to 90 min at 100° F. to 125° F., then poured into small glass bottles. Moreover, myceliated agricultural products were reformulated into value added products such as egg noodles, meat substitutes, specialty flavorings, cooking sauces, soup ingredients and the like.

Example 4

For a large batch liquid-state and solid-state operation, pure cultures were grown aerobically and inoculated into large industrial liquid-state and large solid-state commercial processors operated continuously and aerobically for large-scale fermentation of food products. After cultures of media turned completely white or a representative color thereof for a particular species, and had completely overgrown and commanded the medium and were resistant to gentle mixing, the contents were harvested, removed to plastic bags and refrigerated for quick use at either 40° F., or frozen for long-term storage, and subsequent utilization, at −20° F. Fermented media were prepared into gourmet human foods including: "tempeh style" meat substitutes, egg-noodles, specialty flavorings, breads, extracts and cooking-sauces, or used directly as a fresh ingredient in soup and/or stir fried recipes, or packaged.

Example 5

Agricultural substrates were completely myceliated by inoculating with pure cultures of fungal strains selected from *A. blazei, C. sinensis, G. lucidum, H. erinaceus, G. frondosa, P. eryngii, P. ostreatus, P. citrinopileatus, P. djamor, T. versicolor, L. edodes, F. velutipes, V. volvacea, H. marmoreus, P. nameko, I. obliquus, M. hortensis, P. umbellatus,* and *T. fuciformis* were subjected to heat treatment 1 hour to 24 hours prior to harvest for 1 min to 2 hours at 145° F. to 195° F. followed by recovery at room temperature for 45 min to 48 hours.

Example 6

71 lbs. of cacao beans were soaked in an equivalent volume of water for 5 minutes, after which the water was filtered off and the cacao was equally distributed into 10 polypropylene bags with 0.2 μm breather patches. The tops of the bags were folded over the bag and had rubber bands wrapped around each side of the bag. The bags were sterilized for 140 minutes at 22 psi with slightly dry saturated steam at 255° F. The bags were then cooled in a sterile environment for 8 hours, and were subsequently inoculated with submerged liquid tissue cultures of *Ganoderma lucidum, Cordyceps sinensis, I. obliquus,* or *Morchella angusticeps,* with sterile tools and in sterile operation inside a sterile laminar flow hood. The inoculant were grown in 4 L flasks, in 1.5 L of media prepared from the mixture with 10 L of organic potato extract, 2 L of raw cacao bean extract, and 1 L organic mango juice, and 50 mL of inoculant was used for each bag of cacao after the inoculant had grown for 7 days under 60 RPM of 1 in. radius agitation. The cultures myceliated for two weeks, whereupon they were dried and tasted. It was noted that the *H. erinaceus* and *I. obliquus* cacao conferred the least bitter taste (most improved taste).

Example 7

Samples of Barley, Brown Rice, Buckwheat, Bulgur (cracked wheat), flaxseed, Grano, Millet, Oats, Oat Breat, Oat Cereal, Oatmeal, Popcorn, Whole Wheat Cereal Flakes, Muesli, Rolled Oats, Quinoa, Rye, Sorghum, Spelt, Triticale, Whole Grain Barley, Wheat Berries, Whole Grain Cornmeal, Whole Rye, Whole Wheat Bread, Whole Wheat Couscous, and Wild Rice were individually mixed with half their volume of water in appropriately prepared quart ball jars or autoclavable bags with breather patches and sterilized at 15 psi for 90 minutes or 22 psi for 80 minutes. Once cool, the grain jars were inoculated with half to whole colonies of floating or submerged fungal cultures selected from one of the following: *Ganoderma lucidum, Cordyceps sinensis, Hericium erinaceus, Agaricus blazei, Grifola frondosa, Pleurotus ostreatus, Trametes versicolor, Laetiporus sulphureus, Flammulina velutipes, Lentinula edodes, Morchella angusticeps, Morchella crassipes, Morchella hesculenta, Tremella fuciformis*, and *Inonotus obliquus*, where the floating cultures were grown on an organic undefined media in quart or half-gallon ball jars, and where the submerged cultures were grown in 4 L flasks in 1.5 L of undefined media. After myceliating for two weeks, the jars were thoroughly grown through, and were pasteurized at 212° F. in a double boiler for 7 minutes before being cooked and consumed as tempeh, or further formulated into a nutriceutical (i.e. formulated into 2 gallons honey in association with the small molecules ascorbic acid (1 g) and citric acid (10 g) with 8 mL of orange and tangerine essential oils with). This formulation step began by blending the pasteurized culture with 2 liters of water, or not, and then the ascorbic and citric acid was added to the blend, then the essential oils, then the honey, the formulation was then heated in a double boiler, bottled, and pasteurized once bottled to ensure a secure seal.

Example 8

Small Batch Work-Cacao 48 lbs. of cacao beans were divided into 48 equal portions in clean quart ball jars with lids constructed to enable gaseous diffusion past a collar. These 48, 1 lbs. masses of cacao beans were soaked with ¾ quart of water for two hours. The water in the mixtures was filtered off. The jars were then subjected to 90 minutes of sterilization temperatures at 15 psi, and placed in a sterile laminar air flow to cool for 8 hours. Once cool, the cacao beans were inoculated with half to whole colonies of fungus selected from one of the following: *Ganoderma lucidum, Cordyceps sinensis, Hericium erinaceus, Agaricus blazei, Grifola frondosa, Pleurotus ostreatus, Trametes versicolor, Laetiporus sulphureus, Flammulina velutipes, Lentinula edodes, Morchella angusticeps, Morchella crassipes, Morchella hesculenta, Tremella fuciformis*, and *Inonotus obliquus*, doing three of each, growing on an undefined vegetable and fruit juice agar media containing green cacao extract as described, with sterile tools and in sterile operation inside the laminar flow hood. The cultures myceliated for 7 to 21 days, with samples of each being pulled out for drying and roasting at the $7^{th}$, $14^{th}$, and $21^{st}$ days. The smell of the culture and taste of the cacao at the $7^{th}$ day indicated that the cultures were complete, though longer myceliation periods yielded greater cell mass.

Large Batch Work-Cacao 528 lbs. of cacao beans or other agricultural substrate were soaked in two different procedures. In the first procedure, the beans were soaked three times, for 20 minutes each soak, in the second procedure, the beans were soaked for 20 minutes through a constant stream of filtered water. The beans were then packed into polypropylene bags with 0.2 micron breather patches, with the tops of the bags folded over with rubber bands wrapped around the sides of the bags, such that steam and gas diffusion could occur through breather patch and through the folded sides of the bags. The bags were sterilized under a liquid cycle at 22 psi for 80 minutes, and then allowed to cool for 8 hours. The bags were inoculated with fungi from the following species: *Ganoderma lucidum, Cordyceps sinensis, I. obliquus*, and *Morchella angusticeps*. The *Ganoderma lucidum* culture was grown in a bioreactor, with 10 L of organic potato extract, 2 L of green coffee extract, and 1 L organic mango juice diluted to 100 liters with RO water. The bioreactor was sparged with compressed air filtered through two inline 0.2 micron hydrophobic capsule filters, and the reactor was kept under 2-3 psi through the use of check valves on the air supply and venting lines with 2-3 psi cracking pressure ratings. The inoculant was readily grown in 48 hours, and was harvested through a diaphragm valve located at the bottom of the reactor, which led to a harvesting line that had teed and valved off access to a steam line and steam trap, with an inline check valve, through six feet of flexible stainless steel hosing, to a solenoid valve connected to a timer and foot switch, followed by a flow metering valve to an elbowed sanitary fitting. While being steamed, the elbowed sanitary fitting was connected to a ball valve that connected to the steam exhaust manifold. The ball valve was closed after steaming the line, and the ball valve was detached from the harvesting line once entered into a laminar flow hood, so as to keep the whole line sterile. The *Cordyceps sinensis, Tuber melanosporum*, and *Morchella angusticeps* cultures were grown in 4 L flasks, in 1.5 L of the same media used in the bioreactor pre-dilution. These cultures were grown for six days, and were used to inoculate the bags of sterilized cacao beans or other agricultural substrate. The beans were myceliated for 7 days, where their smell conferred the desired taste profile of the beverage made from the roasted myceliated beans, whereupon they were dried on the $8^{th}$ day to a 13% moisture content.

Example 9

A suitable fungi for use in the methods of the present invention was prepared by the following methods. The following *G. lucidum* strains were purchased commercially from the Pennsylvania State University mushroom culture collection: 496 Ling ZHI; Singapore commercial line; July, 1985; 502 IFO #8436; IFO-Japan; July 30, 1985; 510 Red oak, State College, Pa.; D. J. Royse; September, 1985; 549 Y. H. Park, ASI-Korea; Dec. 5, 1985; 550 Y. H. Park, ASI-Korea; Dec. 5, 1985; 551 Y. H. Park, ASI-Korea; Dec. 12, 1985; 580 Y. H. Park, ASI-Korea; Feb. 2, 1985; 607 Y. H. Park, ASI-Korea; Feb. 19, 1985; 617 Y. H. Park, ASI-Korea; Feb. 25, 1985; 618 Y. H. Park, ASI-Korea; Feb. 25, 1985; 619 Y. H. Park, ASI-Korea; Feb. 25, 1985; 620 Y. H. Park, ASI-Korea; Feb. 25, 1985; 621 Y. H. Park, ASI-Korea; Feb. 25, 1985; 622 Y. H. Park, ASI-Korea; Feb. 25, 1985; 623 Y. H. Park, ASI-Korea; Feb. 25, 1985; 624 Y. H. Park, ASI-Korea; Feb. 25, 1985; 625 Y. H. Park, ASI-Korea; Feb. 25, 1985; 626 Y. H. Park, ASI-Korea; Feb. 25, 1985; 627 Y. H. Park, ASI-Korea; Feb. 25, 1985; 665 Quimio; Philippines; Mar. 6, 1986; 669 Y. H. Park, ASI-Korea; Mar. 25, 1986; 686 B. W. Yoo; Apr. 28, 1986; 724 T. Mitchel, Lawn PSU Forestry Bldg. Sep. 16, 1990; 806 Alice Chen; Buffalo, N.Y.; April, 1994; 807 Alice Chen; N. C.; April, 1994; 841 White Oak; PSU Campus; J. Peplinski; August, 1999. The above strains were cultured using the media described herein comprising cacao beans or other agricultural substrates extract (see Example (10). Many strains were unable to grow and/or died on the media. Surprisingly, the inventors found that *G. lucidum* strain 806 Alice Chen; Buffalo, N.Y. was able to grow on the media comprising green coffee bean extract and was selected for further use in accordance with the instant invention.

Example 10

Fungi (including *G. lucidum* strain 806, *C. sinensis* strain859, as described herein, also *H. erinaceus, T versicolor, L. edodes, T matsutake, F. velutipes, A. blazei, G. frondosa, P. nameko, L. officinalis, M. hortensis, M. angusticeps, A. auricula, T fuciformis, I. obliquus, F. fomentarius, L. sulfureus*) were maintained on a culture comprising an undefined media including extract of cacao beans. Experiments showed that use of the media including extract of cacao beans to culture the maintained the fungi's ability to tolerate, grow on, metabolize, remove or reduce caffeine or undesirable flavor components. It was also found that successive propagations of fungi as defined above caused enhancement and/or improvement of the fungi's ability to tolerate, grow on, metabolize, remove or reduce caffeine or decrease undesirable flavor components, resulting in training or adapting the fungi to undefined media including extract of cacao beans. Such fungi with changed, improved, and adapted properties as described herein, relative to the starting strains, either selected or unselected, were developed. These adapted strains were deposited with the ATCC as described elsewhere herein.

The undefined media including extract of cacao beans was made as follows: 2 lbs cacao beans or other agricultural substrate, pulverized was mixed with ¼ gallon water at room temperature. The mixture was allowed to extract for 20 minutes with shaking, then filtered three times through fine mesh. Separately, 5 organic potatoes were placed in 10 L of water and autoclaved 20 minutes to soften the potatoes. The potatoes were then pulverized with a potato masher, and then filtered through fine mesh three times. 1 L of commercial unsweetened fruit juice was be added. These solutions are combined and autoclaved. This recipe was also scaled up or down as required.

The washed cacao beans were washed in water and the moisture content was raised to about 30%. At other times the moisture content was raised to about 60%.

Liquid culture: The culture comprising fungi for use in inoculating the prepared cacao beans or other agricultural substrate was agitated with sparged air and a motorized paddle to create turbulent environment and to shear hyphae with pure mechanical force. The dual agitation method was superior to either method individually, since sparged air created the most turbulence at the top half of the culture, while affecting the bottom less, which was agitated by a motorized paddle. In return the paddle could be run at a lower RPM and still obtain the hyphal sphere size obtained by a faster RPM in the absence of sparging. The hyphal size was about 2-5 micron in diameter). Undamaged mycelium and proper morphology in the prepared fungi were prepared by this method and used for culturing and/or myceliation.

Example 11

80 kg of provided green cacao beans from the Ivory Coast were dispensed into a food-grade 5 gallon bucket 5 kg at a time, and RO water was added to fully submerge the beans. After soaking for 5 minutes, the contents of the bucket were poured through a fine stainless-steel mesh colander and the wet beans were recovered. After each soak, the beans were placed into clean 2.2 mm polypropylene bags with dimensions of 5"×8"×19" (depth×width×height), outfitted with a 2"×3" 0.2 µm filter patch, 2.2 kg of beans per bag. The bags were gently rolled up so as not to invert the contents of the bag, and loosely wrapped with EPDM bands. The 36 prepared bags were loaded into an autoclave and sterilized on a 140 minute liquid cycle with 122-124° C. slightly superheated steam. The bags were then taken out of the autoclave and stored in a clean-space to cool for 12 hours. At this point, the beans were inoculated with 200 mL of submerged liquid tissue cultures of *Ganoderma lucidum, Cantharellus cibarius, Morchella angusticeps, Tricholoma matsutake*, or *Grifola frondosa*, and sealed with a bag-sealer. These cultures had been prepared as 1.5 L cultures in 4 L Erlenmeyer flask. The culture media comprised 4 g/L organic potato starch powder, 0.4 g/L organic carrot powder, and 10% (v/v) aqueous cacao bean extract. The aqueous cacao bean extract had been prepared by soaking 1 lb of cacao beans in 2 gallons of water for half an hour at room temperature, and collecting the filtrate through 3 filtrations through a fine mesh colander. 3 flasks were prepared for each strain, and they were sterilized for 130 minutes on a liquid cycle with 122-124° C. slightly superheated steam. These flasks were inoculated from Petri plates that had been grown on media comprising 8 g/L organic potato starch, 0.6 g/L organic carrot powder, 33% (v/v) organic mango puree, and 18 g/L agar. The submerged liquid cultures grew for 7 days and shook at 120 RPM on a 1" diameter swing radius. The inoculated cacao bean cultures myceliated for 21 days, at which point the cultures were dried to an 8 to 9% moisture content. The beans were uniformly myceliated, with a sheath of white around every shell. The beans were then sent off to a professional chocolate manufacturing company for formulation into chocolate.

Example 12

20 kg of provided green CCN51 cacao beans were split into 2, 9 kg samples, with 2 kg being kept back as a control. Each 9 kg sample was dispensed into a food-grade 5 gallon bucket and soaked in RO water for 10 minutes. The beans were subsequently recovered through filtration through a fine stainless-steel mesh colander, and dispensed into clean 2 L Wheaton flasks, 1 kg at a time. The flasks were outfitted with tin-coil collars as is known in the art. These 18 flasks were sterilized for 120 minutes on a gravity cycle with 121-122° C. saturated steam, and cooled in a clean space for 8 hours.

Before inoculation, 50 mL of 2-methoxy-3-isopropylpyrazine was added to 2 cultures, 100 mL of 2-methoxy-3-isopropylpyrazine added to another 2 cultures, 150 mL of 2-methoxy-3-isopropylpyrazine added to another 2 cultures, 200 mL of 2-methoxy-3-isopropylpyrazine added to another two cultures, and 250 mL of 2-methoxy-3-isopropylpyrazine added to another 2 cultures. These 8 cultures were then inoculated, 4 with submerged liquid tissue cultures of *Ganoderma lucidum* and 4 with submerged liquid tissue cultures of *Cordyceps sinensis*. The other 10 cultures were inoculated in a similar manner, 5 of *G. lucidum* and 5 of *C. sinensis*. These cultures were made from media comprising 8 g/L organic potato starch powder and 0.6 g/L organic carrot powder, and were 1.5 L in volume in 4 L Erlenmeyer flasks. These cultures had been inoculated from Petri plates comprising 40% (v/v) organic mango puree, and grew for 4 days on a shaker table at 120 RPM with a 1" diameter swing radius. The cultures with no additional 2-methoxy-3-isopropylpyrazine myceliated for 21 days, at which point they were dried for 2 days to an 8 to 9% moisture content. The cultures comprising 2-methoxy-3-isopropylpyrazine took longer to myceliate, and went for 40 days. Before drying, beans from each sample were plated out onto 10 plates with media comprising 20% (v/v) organic potato extract and 15% (v/v) organic carrot extract, so as to isolate the 2-methoxy-3-isopropylpyrazine adapted strains. 80 plates in total were made. The remaining beans were dried over 2 days to an 8 to 9% moisture content, though were not formulated, as the lingering 2-methoxy-3-isopropylpyrazine smell was determined too intense for food. The isolated strain was subsequently used to myceliate more provided CCN51 cacao beans in an identical manner as discussed above, except that the myceliation went for 21 days, as for the non-adapted strain. 5 people tasted the formulated chocolate, and there was a marked difference between the flavor of the 2-methoxy-3-isopropylpyrazine adapted strain as compared to the non-adapted. Both strains of each species generated an edible CCN51 bean (the control was determined to be completely non-palatable), though the 2-methoxy-3-isopropylpyrazine adapted strain created a richer, almost buttery type flavor.

Example 13

15 kg of provided Ecuadoran green cacao beans were dispensed into 14 2.2 mm polypropylene bags at 1 kg/bag. 1 kg of provided green cacao beans were held back as a control. The bags had dimensions of 4"×5"×19" (depth× width×height), and were outfitted with a 3"×2" 0.2 µm breather patch. 500 mL of RO water was added to each bag. The bags were carefully rolled-up so as not to invert the contents of the bag, and loosely wrapped with EPDM bands. The bags were placed into an autoclave and sterilized for 120 minutes on a liquid cycle with 121-122° C. saturated steam. Once the cycle finished, the bags were moved into a clean-space and cooled for 15 hours, at which time they were inoculated, half with 400 mL of submerged liquid tissue cultures of *Hericium erinaceus* and half with 400 mL of submerged liquid tissue culture of *Inonotus obliquus*. The cultures had media comprised of 4 g/L organic potato starch, 0.4 g/L organic carrot powder, and had 15 g of cacao beans added to the 1.5 L volume before being sterilized. The 4 L Erlenmeyer flasks containing the sterilized media were inoculated from Petri plates. The *H. erinaceus* cultures myceliated for 21 days, but the *I. obliquus* cultures were fully colonized by day 7. The samples were then dried for 3 days to a 7-8% moisture content, and 2.5 kg of each sample was formulated into chocolate over the course of 5 days. Another 2 days were spent formulating the control sample into chocolate. The formulated myceliated chocolate was tasted by 5 people, and the results confirmed that these two fungal species effect wonderful flavor changes on cacao. Both had distinct buttery flavors, the *H. erincaceus* sample had a unique almond smell, while the *I. obliquus* sample was the smoother of the two. The control sample was determined to be too bitter to eat.

Example 14

0.5 kg of provided Nigerian green cacao beans were soaked in a 2 gallon stainless-steel kettle for half an hour, at which point the beans were collected through a fine stainless-steel mesh filtration. The hydrated cacao beans were placed into 2 separate 1 L Wheaton jars, which were subsequently outfitted with tin-foil collars. The jars were placed into an autoclave and sterilized for 120 minutes, upon which time they were placed into a clean-space to cool. Three days later they were inoculated with *Ganoderma lucidum* from Petri plates. A 1 in$^2$ piece of a Petri plate was used for one sample, while the rest of the plate was used for the other. The Petri plates were grown on a medium comprising aqueous organic potato extract and organic mango puree. The samples each myceliated for 60 days. An interesting growth cycle occurred, where the fungi in the sample from the 1 in$^2$ piece of Petri plate inoculant went through three separate log phases to fully colonize the culture. The other culture myceliated fully in 22 days. Both samples went for 60 days, at which point in the time the mycelium was thick and fuzzy, and most likely past the point of palatable consumption, the inventors being convinced from the smell that the chocolate made from such samples would have an overwhelming fungal taste.

Example 15

The coffee beans and grounds produced by the methods of the instant invention contained added polysaccharides and β glucans. An analysis showed that Robusta coffee grounds produced by the methods of the invention had 30.54 mg dextran per gram of coffee grounds. This result provided the total polysaccharide amount in the substrate through a spectrophotometric method based on a modified phenol-sulfuric acid approach. The analysis also showed that Robusta coffee grounds produced by the methods of the invention had β glucans at 0.432%, as measured by the MYBG method utilizing strong hydrolysis conditions to hydrolyze β glucan with quantification by spectrophotometric method. This represents an advantage over consuming beta-glucans from Reishi mushrooms, as these mushrooms are a non-culinary mushroom for reasons of bitterness, woodiness, and hardness, or in pill form.

Example 16

Taste Comparison 1, *G. Lucidum* on Ivory Coast Cacao Beans

A chocolate company out of southern France, confirmed the flavor enhancing effects of myceliation by G. lucidum on their own cacao beans sent to the inventors to experiment with. Their trained tasters sampled myceliated and normal (unmyceliated) cacao products in blind taste tests. Notes were taken and detailed analyses were conducted. Bitterness was reduced by approximately 50% and desirable nutty flavors were increased.

Taste Comparison 2 Cacao Beans

Cacao beans prepared by the method of the invention were processed into chocolate and tasted to compare to chocolate made by beans that had not been subjected to instant processes. The taster stated that the chocolate from the myceliated chocolate had an aroma and taste that was richer, smoother, and sweeter with less bitter, harsh, and/or acidic tastes and aromas than compared with the chocolate made from the untreated cacao beans. The taster stated that less sugar and/or other sweetener such as dairy were necessary to create a chocolate that was highly palatable as compared to chocolate made from the untreated cacao beans.

What is claimed is:

1. A method for preparation of a myceliated cacao product, comprising:

a) providing prepared cacao beans comprising the steps of:
   i. providing cacao beans;
   ii. sterilizing or pasteurizing the prepared cacao beans;
b) providing a prepared fungal component selected from the group consisting of *Ganoderma lucidum, Hericium erinaceus, Tricholoma matsutake, Morchella esculenta*, and *Inonotus obliquus* in liquid tissue culture;
c) inoculating the prepared cacao beans with the prepared fungal component from liquid tissue culture; and
d) culturing the prepared cacao beans and prepared fungal component for between seven and fourteen days to allow myceliation to prepare the myceliated cacao product, and wherein the myceliated cacao product has reduced bitterness compared to cacao products made with non-myceliated cacao beans and lacks a fungal taste.

2. The method of claim 1, wherein the method reduces the amount of at least one undesirable taste component.

3. The method of claim 2, wherein the undesirable taste component is 2-methoxy-3-isopropylpyrazine.

4. The method of claim 2, wherein the undesirable taste component is a methylxanthine, catechin, epicatechin, or gallic acid equivalent.

5. The method of claim 1, wherein the step of providing prepared cacao beans further comprises hydrating the cacao beans.

6. The method of claim 5, wherein the cacao beans are hydrated to about a 20% to about 80% moisture level.

7. The method of claim 1, wherein the prepared fungal component is *G. lucidum*.

8. The method of claim 7, wherein the prepared fungal component is *H. erinaceus*.

9. The method of claim 1, wherein the prepared fungal component is *I. obliquus*.

10. The method of claim 1, wherein the prepared fungal component is prepared by a method comprising screening a number of strains of fungi and selecting a strain having an enhanced ability to tolerate, grow on, metabolize or utilize cacao beans.

11. The method of claim 1, wherein the prepared fungal component is prepared by a method comprising maintaining a strain of fungi on an undefined media comprising an aqueous cacao bean extract and an energy source.

12. The method of claim 1, wherein the prepared fungal component is prepared by a method comprising maintaining a strain of fungi on an undefined media comprising a methylxanthine, catechin, epicatechin, or gallic acid equivalent or 2-methoxy-3-isopropylpyrazine, and an energy source.

13. The method of claim 12, wherein the maintenance of the strain of fungi causes adaptation of the fungi resulting in enhancement of the fungi's ability to tolerate, grow on, metabolize or utilize cacao beans or other agricultural substrate.

14. The method of claim 1, wherein the culturing step is carried out for about 7 days.

15. The method of claim 1, wherein the myceliated product has a reduced level of at least one undesirable taste component and an increased level of at least one myceliation product, relative to the cacao beans.

16. The method of claim 15, wherein the myceliation product is a β-glucan, pyrazine, or polysaccharides.

17. A myceliated product prepared by the method of claim 1.

18. The method of claim 1, wherein the prepared fungal component is *M esculenta*.

19. The method of claim 1, wherein the prepared fungal component is *T matsutake*.

20. The method of claim 1, wherein the wherein the myceliated cacao product has a richer, smoother and/or sweeter taste compared with cacao products made with non-myceliated cacao beans.

* * * * *